(12) United States Patent
Allum et al.

(10) Patent No.: US 9,267,018 B2
(45) Date of Patent: Feb. 23, 2016

(54) EPOXY COMPOSITE

(75) Inventors: Ronald Charles Allum, Lilyfield (AU); Philip Michael Durbin, Grove (AU)

(73) Assignee: ACHERON PRODUCT PTY LTD., St. Peters, New South (AU)

(*) Notice: Subject to any disclaimer, the term of this patent is extended or adjusted under 35 U.S.C. 154(b) by 413 days.

(21) Appl. No.: 13/806,600

(22) PCT Filed: Jun. 23, 2011

(86) PCT No.: PCT/AU2011/000772
§ 371 (c)(1),
(2), (4) Date: Mar. 11, 2013

(87) PCT Pub. No.: WO2011/160183
PCT Pub. Date: Dec. 29, 2011

(65) Prior Publication Data
US 2013/0172448 A1 Jul. 4, 2013

(30) Foreign Application Priority Data
Jun. 24, 2010 (AU) ................................ 2010902788

(51) Int. Cl.
C08K 7/22 (2006.01)
C08K 7/02 (2006.01)
C08G 59/18 (2006.01)
B29C 70/66 (2006.01)
C08J 9/32 (2006.01)
C08K 7/28 (2006.01)
B29B 7/84 (2006.01)
B29B 7/90 (2006.01)
B29C 70/02 (2006.01)
C08L 63/00 (2006.01)
B29K 63/00 (2006.01)
B29K 105/16 (2006.01)

(52) U.S. Cl.
CPC ... C08K 7/28 (2013.01); B29B 7/84 (2013.01); B29B 7/90 (2013.01); B29C 70/025 (2013.01); B29C 70/66 (2013.01); C08L 63/00 (2013.01); B29K 2063/00 (2013.01); B29K 2105/165 (2013.01)

(58) Field of Classification Search
None
See application file for complete search history.

(56) References Cited

U.S. PATENT DOCUMENTS

| | | | | |
|---|---|---|---|---|
| 3,477,967 A * | 11/1969 | Resnick | | 523/219 |
| 3,585,157 A * | 6/1971 | Beck | | 521/54 |
| 3,849,350 A | 11/1974 | Matsko | | |
| 4,568,603 A | 2/1986 | Oldham | | |
| 4,595,623 A | 6/1986 | Du Pont et al. | | |
| 4,598,106 A * | 7/1986 | Utsugi | | 523/218 |
| 4,681,718 A | 7/1987 | Oldham | | |
| 4,788,230 A | 11/1988 | Mudge | | |
| 6,068,915 A | 5/2000 | Harrison | | |
| 6,348,513 B1 | 2/2002 | Hilborn et al. | | |
| 2009/0142645 A1 | 6/2009 | Aalto et al. | | |
| 2013/0216815 A1* | 8/2013 | Coyle | | 428/221 |

FOREIGN PATENT DOCUMENTS

| | | | | |
|---|---|---|---|---|
| JP | 61-501211 | 6/1986 | | |
| JP | 02-218715 | 8/1990 | | |
| JP | 2010065183 A * | 3/2010 | | C08J 9/32 |
| WO | 85/05069 A1 | 11/1985 | | |
| WO | 85/05113 A1 | 11/1985 | | |
| WO | 99/57182 | 11/1999 | | |

OTHER PUBLICATIONS

Machine translation of JP 2010065183 A, provided by the JPO website (no date).*
English translation of CN Office Action mailed Sep. 23, 2014, CN Patent Application No. 201180034940.7.
English translation of JP Office Action mailed Sep. 24, 2014, JP Patent Application No. 2013-515637.
Karst, G., "Novel processing of high-performance structural syntactic foams," 47th Internaional SAMPE Symposium, May 12-16, 2002, Cornerstone Research Group, Inc., Dayton.
Website: http://www.xtek.net/investors/xtclave-technology-hydroclave/ accessed Jan. 30, 2013.
XTEK, Ltd, Jul. 3, 2012 "Release to the Australian Securities Exchange, Completion of Large Scale XTclave™ Armour Technology Plant" (2 pages).
XTEK, Ltd, Oct. 4, 2012 "Release to the Australian Securities Exchange, XTEK Armour Technology to be evaluated by the US Defense Department" (6 pages).
Extended European Search Report, EP Patent Application No. 11797397.4, mailed Feb. 10, 2015.

* cited by examiner

*Primary Examiner* — Michael J Feely
(74) *Attorney, Agent, or Firm* — Casimir Jones, SC

(57) ABSTRACT

The invention relates to a process for making a epoxy composite. In the process an epoxy prepolymer, a curing agent and a particulate filler are combined to form a curable mixture. The mixture is then agitated under a non-air atmosphere to render it substantially homogeneous, and pressure is applied to the mixture to reduce or eliminate gas pockets in the mixture and is maintained until the curable mixture is cured to form the epoxy composite.

20 Claims, 16 Drawing Sheets

EPOXY COMPOSITE

TECHNICAL FIELD

The present invention relates to a process for making an epoxy composite.

BACKGROUND OF THE INVENTION

The inventor required an exceptionally high, and uniform, strength syntactic foam for flotation and as a structural element for a deep sea application. Various commercial foams were tested and all failed to meet a suitable FofS (factor of safety). It is considered that the failure of these materials is in part due to non-uniformity of the materials, leading to variable strength characteristics in different parts of the material. The commercial foams tended to fail on one side first and/or develop serious cracks. As a rather large piece of foam was required in order to provide floatation and structural integrity for the application, the inventor considered the low FofS and the non-uniform strength of commercial foams to be a major disadvantage.

Epoxy composites may be made by combining an epoxy prepolymer, a curing agent and a filler and alloys the resulting mixture to cure. The filler may serve one or more of a number of purposes including increasing stiffness, increasing strength, improving crack resistance and reducing density in the cured composite. If a low level of filler is used, the improvement in properties may be less than required. Also the uncured mixture may have a relatively low viscosity. This can allow partial separation of the filler (due to the different densities of the filler and the epoxy prepolymer) resulting in a cured composite with inhomogeneous properties.

These problems may be addressed by increasing the level of filler in the mixture. This however results in new problems. Increasing the level of filler results in an increase in the viscosity of the uncured mixture. Stirring this mixture in order to achieve a homogeneous product can result in inclusion of large amounts of air, which can generate voids in the cured composite. These voids can adversely affect the physical properties (strength etc.) of the cured composite. Application of a vacuum when mixing can partially address this problem, however the high viscosity of an uncured composite with high filler loading can make it difficult to remove all air bubbles.

There is therefore a need for a process for making epoxy composites which reduces or eliminates voids while allowing for a relatively high filler loading.

OBJECT OF THE INVENTION

It is an object of the present invention to substantially overcome or at least ameliorate one or more of the above disadvantages. It is a further object to at least partially satisfy the above need.

SUMMARY OF THE INVENTION

In a first aspect of the invention there is provided process for making a epoxy composite comprising combining an epoxy prepolymer, a curing agent and a particulate filler to form a curable mixture, agitating the mixture to render it substantially homogeneous and applying pressure to the mixture to reduce or eliminate gas pockets in the mixture. In the present context, the term "reduce" refers to a reduction in size (e.g. volume) of the gas pockets. The pressure should be maintained until the curable mixture is cured to form the epoxy composite. The step of agitating, and optionally also of combining, may be conducted under a non-air atmosphere.

The following options may be used in conjunction with the first aspect, either individually or in any suitable combination.

The pressure applied to the mixture may be at least about 7000 kPa, or may be about 7000 to about 15000 kPa. It may alternatively be about 2000 to about 7000 kPa. The lower pressures may be used to make composites for use at lower pressures than those made using higher pressures. The pressure may be applied isostatically. It may be applied hydrostatically. The prepolymer and the curing agent may be such that the working time of the curable mixture at 20° C. is at least about 1 hour, or at least about 6 hours, or at least about 1 day. They may be such that the curable mixture does not cure at about 20° C., or such that it does not cure at about 20° C. for at least about 1 day or at least about 1 week.

The combining may be accompanied by, or preceded by, cooling of one or more of the components of the curable mixture. It may for example comprise cooling the prepolymer and then adding the curing agent and particulate filler. The cooling may be to a temperature of about 0 to about 10° C., e.g. to about 3° C.

The non-air atmosphere under which the agitating, and optionally also the combining, is conducted may be one which has a solubility in the curable mixture which is higher than the solubility of air in the curable mixture at the same temperature. The non-air atmosphere may comprise at least about 50% argon on a molar basis. It may be welding gas. It may comprise about 93% argon and about 5% carbon dioxide. It may comprise about 2% oxygen. It may comprise about 93% argon and about 7% carbon dioxide.

The step of applying pressure may be conducted such that the mixture is not exposed to air. It may be conducted under the non-air atmosphere, as described above. It may be conducted surrounded by a protective layer or barrier material which inhibits or prevents access of air and/or the non-air atmosphere to the mixture. It may be applied isostatically by a surrounding fluid (liquid or gas), and the protective layer or barrier material may inhibit or prevent access of the surrounding fluid to the mixture.

The particulate filler may have a lower density, or true density, than the prepolymer. It may have a lower density, or true density, than the curable mixture. It may have a true density of less than about 0.5 g/cc. The particulate filler may be, or may comprise, hollow microspheres. The hollow microspheres may be hollow glass microspheres (glass microbubbles). The hollow microspheres may be such that (e.g. may have a wall thickness such that) no more than about 10% of the microspheres break during the step of applying pressure to the mixture. The particulate filler may in some cases comprise more than one grade of hollow microspheres. One grade may be a high strength grade. Another grade may be a low density grade.

The step of combining may comprise combining the epoxy prepolymer, the curing agent, the particulate filler and a second filler to form the curable mixture. The second filler may comprise about 0.1 to about 1% by weight or by volume of the curable mixture.

The process may comprise heating the curable mixture so as to initiate or accelerate cure to form the epoxy composite. This step may be useful in cases where the curable mixture has a working time of longer than about 6 hours at about 20° C. If a step of heating is used so as to initiate or accelerate cure, the heating may be to a temperature of less than 90° C., or to a temperature of between about 40 and about 90° C. It may be to a temperature at which the working time is less than about 1 hour. The heating (if used) may be commenced at a time (referred to herein as a delay time) after commencement of application of pressure to the mixture. The delay time may be at least about 1 hour. If a step of heating is used so as to initiate or accelerate cure, the epoxy composite may be cooled prior to release of the pressure. In this context, the term "heating to" a particular temperature refers to placing the mixture in an environment at the particular temperature and does not necessarily relate to the actual temperature achieved by the curable mixture in that environment. The actual temperature, at least in parts of the mixture, may exceed the particular temperature due to the exotherm of cure.

The process may be used to make an epoxy composite according to the second aspect (below).

In an embodiment there is provided a process for making a epoxy composite comprising:
  combining an epoxy prepolymer, a curing agent and a particulate filler composed of glass microspheres to form a curable mixture, said prepolymer and curing agent being such that the curable mixture has a working time of longer than about 6 hours at about 20° C.,
  agitating the mixture under an atmosphere comprising argon and carbon dioxide sufficiently to render the mixture substantially homogeneous,
  applying an isostatic pressure of about 7000 to about 15000 kPa to the mixture so as to reduce or eliminate gas pockets in the mixture,
  heating the mixture under the pressure to a temperature of at most 90° C., said temperature being sufficient to cause the mixture to cure.
  allowing the mixture to cure under elevated pressure to form the epoxy composite,
  allowing the epoxy composite to cool to about ambient temperature, and
  returning the epoxy composite to about atmospheric pressure.

In another embodiment there is provided a process for making a epoxy composite comprising:
  combining an epoxy prepolymer, a curing agent, a particulate filler composed of glass microspheres and a fibrous filler to form a curable mixture, said prepolymer and curing agent being such that the curable mixture has a working time of longer than about 6 hours at about 20° C.,
  agitating the mixture under an atmosphere comprising argon and carbon dioxide sufficiently to render the mixture substantially homogeneous,
  enveloping the mixture in a flexible barrier material;
  applying an isostatic pressure of about 7000 to about 15000 kPa to the mixture so as to reduce or eliminate gas pockets in the mixture,
  heating the mixture under the pressure to a temperature of at most 90° C., said temperature being sufficient to cause the mixture to cure,
  allowing the mixture to cure under elevated pressure to harm the epoxy composite.
  allowing the epoxy composite to cool to about 60° C.,
  returning the epoxy composite to about atmospheric pressure; and
  allowing the epoxy composite to cool to ambient temperature at atmospheric pressure over at least 1 day.

In a second aspect of the invention there is provided an epoxy composite comprising a particulate filler and having an ultimate stress under compression of greater than or equal to 100 MPa. The composite may have a density of less than about 0.7 glee.

The following options may be used in conjunction with the second aspect, either individually or in any suitable combination.

The epoxy composite may be made by the process of the first option.

The epoxy composite may be a syntactic foam.

The epoxy composite may have a compressive modulus such that strain under compression of 110 MPa is less than or equal to about 0.9%. It may exhibit linear distortion of less than or equal to about 0.9% under hydrostatic compression pressure of 110 MPa.

It may have a low water absorption. It may have an equilibrium water absorption of less than about 0.5% w/w, or less than about 0.1% w/w.

The density of the particulate filler may be less than about 0.5 g/cc. The particulate filler may be, or may comprise, hollow microspheres. The hollow microspheres may be hollow glass microspheres. The particulate filler may be present in the composite at about 60% or more by volume.

The epoxy composite may additionally comprise a second filler. The second filler may be a fibrous filler. The second filler may comprise aramid fibres and/or e-glass fibres. The fibres may be about 0.2 to about 2 mm in mean length. The second filler may be present in the composite at about 0.1 to about 1% w/w. The epoxy composite may in some cases comprise one or more further fillers.

The epoxy composite of the second aspect may be made by the process of the first aspect.

In an embodiment there is provided an epoxy composite comprising a particulate filler composed of hollow glass microspheres, said composite:
  having an ultimate stress under compression of greater than or equal to 100 MPa,
  exhibiting linear distortion of less than or equal to about 0.9% under hydrostatic compression pressure of 110 MPa; and
  having a density of less than about 0.7 g/cc.

In a third aspect of the invention there is provided use of an epoxy composite according to the second aspect, or made by the process of the first aspect, as a structural component under compression.

The following options may be used in conjunction with the third aspect, either individually or in any suitable combination.

The use may be in a device for use under water. In this context, use "in" a device denotes use as a part of the device, whether inside the device or on the surface of the device or both. The device may be suitable for use at a depth of at least about 10 km beneath the surface of the water. The use may be at a depth of at least about 10 km beneath the surface of the water. The device may be a manned submersible vehicle. It may be an unmanned submersible vehicle. The epoxy composite may form at least part of an outside surface of said device. It may be a structural, or load bearing, part of the outside surface of said device. It may function as a buoyancy element of the device. It may be both a buoyancy element and a structural, or load bearing, part of the outside surface or portion of the device. The use may comprise any one or more of the following steps:
  Forming or cutting or abrading the epoxy composite into a suitable shape, e.g. bricks, tiles or slabs;
  Disposing the composite (e.g. in the form of bricks, tiles or slabs) so as to form a shape (e.g. an 1-beam) suitable for use as a structural part of a submersible vehicle or other device or a part thereof;

Filling gaps between parts (e.g. bricks, tiles or slabs) of the composite with a filling material capable of withstanding the conditions of use of the vehicle or other device.

BRIEF DESCRIPTION OF THE DRAWINGS

A preferred embodiment of the present invention will now be described, by way of an example only, with reference to the accompanying drawings wherein.

DETAILED DESCRIPTION OF THE PREFERRED EMBODIMENTS

Figure 1:
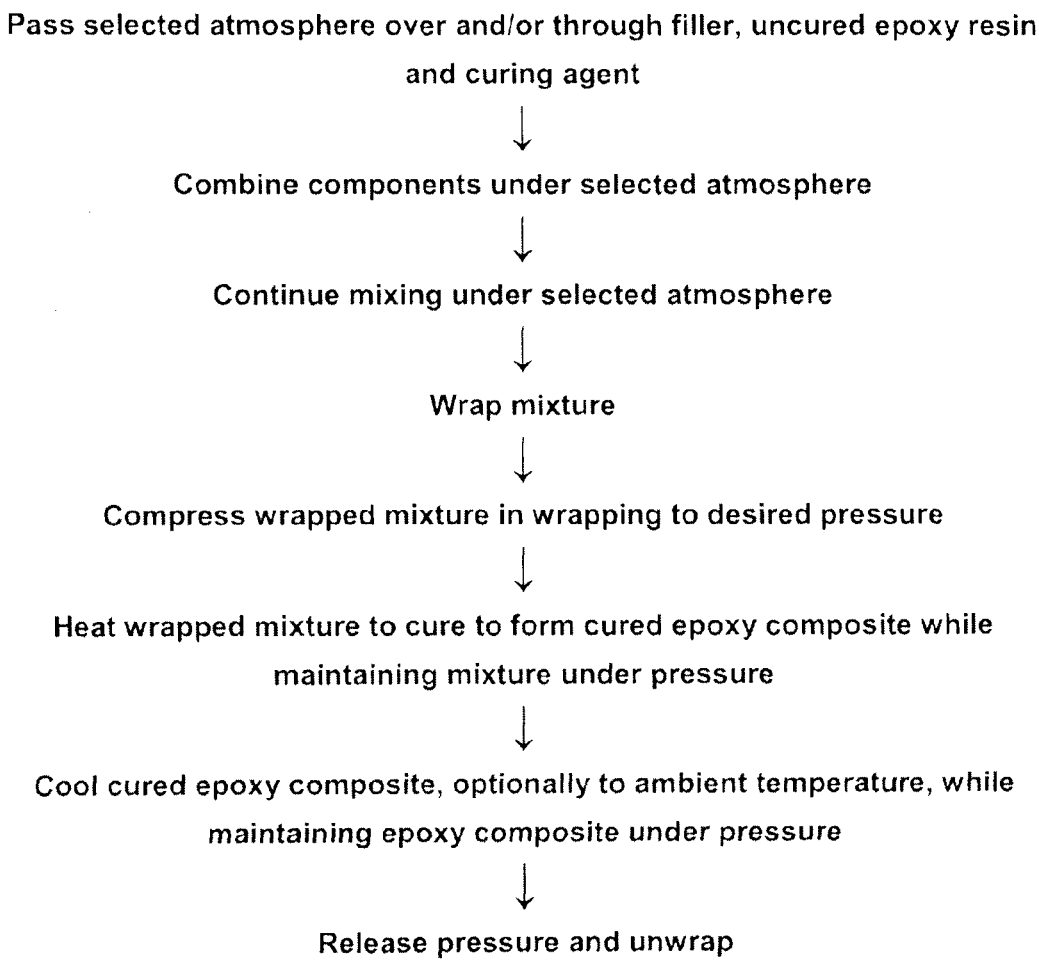
FIG. 1 is a flow chart showing a process for making a cured composite according to the present invention.

The following terms are used in the present specification:
Epoxy: an oxirane ring or a species containing oxirane groups, or a cured material derived from such a species.
Prepolymer: an oligomeric or polymeric species capable of being crosslinked to form a cured resin. The degree of polymerisation will commonly be greater than about 3. A prepolymer is commonly a liquid, which may be highly viscous or may be relatively non-viscous. Viscosities ranging from about 100 to about 100000 cP are common. Prepolymers may be referred to as resins.
Curing agent: a species capable of reacting with an epoxy prepolymer in order to react with epoxy groups in an epoxy prepolymer in order to crosslink the prepolymer to form a cured epoxy resin. The curing agent may comprise thiol and/or amine groups and may comprise a catalyst for the crosslinking reaction. Curing agents may be referred to as hardeners.
Composite: a cross-linked polymer having particles of a filler distributed through the polymer. The cross-links may be physical, chemical and/or physico-chemical. In the present invention the filler is a particulate filler, optionally supplemented by a second filler.
Working time: the time after mixing a curable mixture (prepolymer and curing agent) in which the mixture remains flowable.

Filler: a solid additive incorporated into a polymer (in the present instance, an epoxy) in order to modify its properties. The present specification refers to a particulate filler and a second filler. These terms are used simply to distinguish the different fillers. It will be understood that the second filler may be particulate in nature, albeit, if present, different to the particulate filler.
Non-air atmosphere: an atmosphere which varies from air. The particular non-air atmosphere commonly used in the present invention may have a solubility in the curable mixture which is higher than the solubility of air in the curable mixture at the same temperature. Non-air atmospheres used in the present invention may for example comprise at least about 50% argon on a molar basis. A particular example is welding gas. A suitable non-air atmosphere may for example comprise about 93% argon and about 5% carbon dioxide. It may comprise about 2% oxygen. It may comprise about 93% argon and about 7% carbon dioxide.
Isostatic pressure: pressure applied to a body equally from all sides.

In making an epoxy composite according to the invention, an epoxy prepolymer, curing agent and a particulate filler are combined to form a curable mixture. Commonly, although not necessarily, commercial epoxy prepolymers and curing agents are used. The appropriate ratios of these two will then be provided by the supplier. The ratio is generally within about 10% of a stoichiometric ratio (i.e. that ratio where the mole ratio of epoxy groups and groups such as amines that can react with the epoxy groups). Thus the mole ratio of prepolymer to curing agent (on a functional group basis) may be about 0.9 to about 1.1, or about 0.9 to 1, 1 to 1.1 or 0.95 to 1.05, e.g. about 0.9, 0.95, 1, 1.05 or 1.1. The actual weight (or volume) ratio will depend on the density of functional groups in the prepolymer and the curing agent. Commonly the weight or volume ratio is about 10:1 to about 1:10 on a weight or volume basis, or about 5:1 to 1:5, 2:1 to 1:2, 3:2 to 2:3, 5:1 to 1:1, 5:1 to 3:1, 2:1 to 1:1, 3:2 to 1:1, 1:1 to 1:5, 1:1 to 1:2, 1:1 to 2:3, 1:1 to 1:10 or 10:1 to 1:1 e.g. about 10:1, 9:1, 8:1, 7:1, 6:1, 5:1, 4:1, 3:1, 2:1, 3:2, 1:1, 2:3, 1:2, 1:3, 1:4, 1:5, 1:6, 1:7, 1:8, 1:9 or 1:10. The amount of particulate filler may be sufficient to achieve a volume ratio in the curable mixture of about 60 to about 70%, or about 60 to 65, 65 to 70, 63 to 68 or 66 to 67%, e.g. about 60, 61, 62, 63, 64, 65, 66, 67, 68, 69 or 70%, although in some cases it may be more or less than this, e.g. about 20, 30, 40, 50, 75 or 80%. In the event that the particulate filler comprises hollow microspheres, the amount of particulate filler may be selected such that the packing densities is not sufficiently high as to result in a high proportion of hollow microspheres being crushed by physical contact when isostatic pressure is applied. There should be sufficient epoxy (i.e. sufficiently low amount of particulate filler) that isostatic pressure is applied to each hollow microsphere and there is little or no direct contact between microspheres. Such mixtures are commonly sufficiently viscous to avoid migration/separation of components. The amount of particulate filler may be sufficient to provide a curable mixture which does not separate substantially on standing. It may be sufficient to provide a curable mixture which has a yield point sufficient that it does not separate substantially on standing. It may be sufficient to provide a curable mixture with having a non-zero yield point. It may have a yield stress of at least about 100 Pa, or at least about 200, 300, 400, 500, 600, 700, 800, 900 or 1000 Pa, or having a yield point of about 100 to about 2000 Pa, or about 100 to 1500, 100 to 1000, 100 to 500, 100 to 200, 200 to 2000, 500 to 2000, 1000 to 2000, 200 to 500, 200 to 300, 300 to 500 or 500 to 1000 Pa, e.g. about 100, 150, 200, 250, 300, 350, 400, 450, 500, 600, 700, 800, 900, 1000, 1100, 1200, 1300, 1400, 1500, 1600, 1700, 1800, 1900 or 2000 Pa. In some cases a lower yield stress may be acceptable, e.g. at least about 10, 20, 30, 40, 50, 60, 70, 80 or 90 Pa, or about 10 to about 100, 10 to 50, 50 to 100, 10 to 30 or 30 to 50 Pa, e.g. about 10, 20, 30, 40, 50, 60, 70, 80 or 90 Pa. The non-zero yield point, or high viscosity, or quasi-solid nature of the curable mixture serves to ensure that the particles of the particulate filler do not separate prior to cure of the mixture. This in turn contributes to ensuring that the cured composite is homogeneous in composition, and consequently homogeneous in physical properties. In particular, since the presence of filler particles influences the strength of the cured composite, areas of different filler particle density may have different strength properties, leading to an overall composite with reduced strength relative to a completely homogeneous composite (such as that described herein) with the same macroscopic composition, and are therefore to be avoided.

As noted above, the epoxy (prepolymer and curing agent) may be a commercial product. It may alternatively be purpose made for a particular application. In general it will be selected for its high strength properties. As indicated elsewhere, a major application for the present invention is in high strength low weight syntactic foams for use in underwater applications. The epoxy may be selected to be highly resistant to hydrolysis when cured, for example to hydrolysis by seawater under high pressure. It may be selected to have low or minimal water absorption when cured. It may be selected to have low cured density. It may be selected such that the optimum mixing ratio of prepolymer to curing agent is convenient. It may be selected such that the viscosities of the curing agent and prepolymer are suitable for making a mixture with the particulate filler which has appropriate rheological properties (as outlined above). It may be selected such that the working time of the curable mixture at 20° C. is at least about 1 hour, or at least about 2, 3, 4, 5, 6, 9, 12, 15, 18 or 24 hours, or is about 1 to about 24 hours, or about 1 to 12, 1 to 6, 6 to 24, 12 to 24 or 18 to 24 hours, or 1 to 7 days. It may be selected such that the curable mixture does not cure at about 20° C., or such that it does not cure at about 20° C. for at least about 1, 2, 3, 4, 5, 6 or 6 days. It may be selected such that at a suitable elevated temperature below about 90° C. the curable mixture cures in less than about 5 hours, or less than about 5, 3, 2, 1 or 0.5 hours, e.g. cures in about 0.5, 1, 1.5, 2, 2.5, 3, 3.5, 4, 4.5 or 5 hours. The combination of long working time at about room temperature and relatively rapid cure at elevated temperatures allows for control of the cure, i.e. cure on demand, in that the curable mixture may be manipulated, moulded etc. at room temperature without premature cure and then cure initiated by simply raising the temperature. Cure temperatures of below about 90° C. are convenient because they put less stringent requirements on the equipment used to contain and handle the material. Additionally, hazard levels according to AS4343 are reduced when temperatures are below 90° C. The cure temperature may be less than about 65° C. This may further reduce the associated hazards. Additionally, in some cases an epoxy mixture can cure exothermically, leading to a further rise in temperature. If the cure initiating temperature is too high, the exotherm can increase the internal temperature of the curing mixture to the point where there is damage to the cured composite, for example leading to a reduction in strength.

The inventor has found that when mixing large quantities of the curable mixture, an exotherm can occur spontaneously, leading to cure rates that are more rapid than desired. Premature cure can prevent or inhibit the elimination of voids in the mixture (since application of pressure prior to cure will be for an insufficient time), leading to an imperfect product. In order to prevent or reduce this effect, one or more components of the curable mixture may be cooled, either before or during the step of combining. As it is generally easier to cool when the viscosity is lower, it is common to cool before addition of the particulate filler, since addition of the particulate filler commonly leads to formation of a mixture of paste-like consistency. Thus the epoxy prepolymer may be cooled before addition of other components. In the event that a second filler is used, this is generally used in relatively low concentrations and thus generally has little effect on the viscosity. Accordingly the epoxy prepolymer may be mixed with the second filler prior to the cooling or concurrent with the cooling. Thus one or more components may be provided at low temperature (i.e. at the cooled temperatures described below) or may be cooled as part of the process. The cooling may be to a temperature of about 0 to about 10° C., or about 0 to 5, 5 to 10 or 2 to 6° C., e.g. about 0, 1, 2, 3, 4, 5, 6, 7, 8, 9 or 10° C. For large batches of epoxy composite, this may take some time, e.g. overnight.

A suitable process for forming the curable mixture, therefore, is as follows:

a) combine the epoxy prepolymer and, optionally, second (e.g. fibrous) filler;

b) cool the mixed prepolymer/second filler, for example by mixing in a cool room at about 3° C. overnight;

c) add the curing agent and continue mixing;

d) add the particulate filler, optionally in several batches, and continue mixing until homogeneous;

e) load the resulting mixture into a sheath made of a water impervious flexible barrier material and load the mixture in the sheath into a heating bath inside a pressure vessel;

f) pressurise the heating bath and sheath containing the mixture to the desired pressure and maintain the pressure for a suitable delay time to allow absorption of gases into the mixture;

g) heat the heating bath to about 80° C. for about 8 hours while maintaining the pressure so as to cure the mixture to a cured composite;

h) turn off the heating so as to allow the cured composite to cool; and i) release the pressure. Pressure release may be when the temperature of the block is about 60° C. Release of pressure may be stepwise, in 2, 3, 4, 5 or more than 5 steps. Alternatively it may be continuous, over a period of from about 5 to about 60 minutes, or about 5 to 30, 5 to 15, 15 to 60, 30 to 60 or 15 to 30 minutes, e.g. over about 5, 10, 15, 20, 25, 30, 40, 50 or 60 minutes. The above method may be suitable for mixes of up to about 80 kg or even more.

The inventor has observed that in the absence of externally applied heating, a large temperature gradient may be set up within the curing material. This is thought to be due to evolution of heat due to the cure process, which can escape more readily from the outer regions of the mixture than from the inner regions thereof. This large temperature gradient may result in variable properties through the resulting block of cured material, possibly leading to formation of cracks. External application of heat to the curing block can serve to promote a more even temperature distribution within the curing block and hence more homogeneous properties. In a typical cure profile, therefore, addition of curing agent to the epoxy prepolymer results in a slow exotherm which proceeds as the particulate filler is added. Once this is complete and the final curable mixture is loaded into the heating bath/pressure vessel, heating initiates a inure rapid exotherm. Heating is continued past the peak exotherm of the curable mixture. Once the heating is turned off, the block is allowed to slowly cool. The block will commonly be cooled to about 60° C.

before release of pressure, or to about 50 to about 70° C. At these temperatures, variability within the block is typically less than about 20 Celsius degrees. On release of pressure, the block can be removed from the pressure vessel, typically still at an elevated temperature. Final cooling to room temperature typically can take several days.

The resulting cured block may be trimmed so as to have smooth, flat orthogonal faces having the desired dimensions. Typical dimensions are about 300 mm×300 mm×1300 mm. The width may be about 100 to about 500 mm, or about 100 to 300, 300 to 500 or 200 to 400 mm, e.g. about 100, 150, 200, 250, 300, 350, 400, 450 or 500 mm. The height may be about 100 to about 500 mm, or about 100 to 300, 300 to 500 or 200 to 400 mm, e.g. about 100, 150, 200, 250, 300, 350, 400, 450 or 500 mm. The length may be about 500 to 2000 mm, or about 500 to 1500, 500 to 1000, 1000 to 2000 or 1000 to 1500 mm, e.g. about 500, 600, 700, 500, 900, 1000, 1100, 1200, 1300, 1400, 1500, 1600, 1700, 1800, 1900 or 2000 mm. The block may have no externally visible cracks. It may have no internal cracks or voids. Typically earlier methods have had difficulty producing crack-free blocks of dimensions greater than about 0.02 m$^3$. By comparison, the present method can routinely produce crack-free blocks of over about 0.1 m$^3$.

The curable mix may have an accelerator or catalyst or retardant in order to modify the cure rate. This may be a component of the cure agent or may be added separately. Suitable accelerators/catalysts are commonly trisubstituted amine compounds. Accelerators/catalysts may be for example substituted guanidines, piperazines, imidazoles and phenolic compounds. The accelerator/catalyst may be present in the mixture in sufficient quantity to obtain the desired cure profile as described above.

The particulate filler may be any suitable filler that provides the desired properties in the cured composite containing the filler. It may be a bulking filler. It may be a reinforcing filler. It may be both bulking and reinforcing. It may be a filler for improving buoyancy of the cured composite. It may be a buoyancy improving and reinforcing filler. There may be more than one filler, each, independently, having any one or more properties of bulking, reinforcing and buoyancy improving. The particles of the filler may be spherical, or they may be some other shape, such as ovoid, ellipsoid, cubic, rhomboidal, prismatic, parallelepiped (for example rectangular parallelepiped), oblate spherical, acicular, fibrous, toroidal, polyhedral (with between about 6 and about 50 sides), platelet-shaped, rhomboidal or may be irregular shaped, or may be a mixture of particles of any two or more of these shapes. The particulate filler may be suitable for increasing strength (in tension, shear, bending and/or compression), increasing toughness, increasing resilience, increasing elongation at break, increasing stiffness, increasing modulus (in tension, shear, bending and/or compression) reducing density of the cured composite, reducing water absorption, increasing viscosity of the uncured mixture or for any combination of these effects. The nature and loading of the particulate filler may be selected to obtain the desired properties of the cured composite. Mixtures of particulate fillers may be used in order to obtain these properties.

For use in deep sea applications, a desirable effect is reducing density (i.e. increasing buoyancy), and a preferred additional effect is increasing strength under compression (and preferably also under bending). For this application, hollow microspheres are particularly suitable. Microspheres may be characterised in part by their true density. This may be considered to be the mass of a liquid of density 1.00 g/cc displaced by a microsphere completely immersed in that liquid divided by the volume of the microsphere. It will be apparent from this definition that the true density is not affected by spaces between microspheres, but will be affected by the spaces enclosed within the microspheres. The true density of a microsphere will depend on the material from which the walls are made, the wall thickness and the diameter of the microsphere. Microspheres may be polymeric (e.g. styrene, optionally crosslinked with divinylbenzene, acrylic, for example polymethylmethacrylate, etc.) or may be ceramic or may be glass, i.e. they may be hollow glass microspheres, or may be hollow polymeric microspheres, or may be hollow ceramic microspheres. In some cases mixtures of two or more of these may be used.

Glass microspheres are preferred in the present invention. The true density of the microspheres for use in the invention may be less than about 0.85 g/cc, or less than about 0.8, 0.7, 0.6 or 0.5 g/cc. It may be about 0.1 to about 0.85 g/cc, or about 0.1 to 0.8, 0.1 to 0.5, 0.1 to 0.3, 0.3 to 0.8, 0.5 to 0.8, 0.33 to 0.43 or 0.3 to 0.7, e.g. about 0.1, 0.15, 0.2, 0.25, 0.3, 0.31, 0.32, 0.33, 0.34, 0.35, 0.36, 0.37, 0.38, 0.39, 0.4, 0.41, 0.42, 0.43, 0.44, 0.45, 0.5, 0.55, 0.6, 0.65, 0.7, 0.75 or 0.8 g/cc. They may be substantially monodispersed, or may be polydispersed or may have a polymodal (e.g. bimodal, trimodal etc.) distribution of particle sizes. Monodispersed microspheres may have more uniform crush strength, whereas polydispersed microspheres may have improved packing capabilities, enabling higher loadings of particulate filler in the curable mixture. In this context, "substantially monodispersed" may refer to a dispersion in which less than about 10% of the microparticles (by number of particles) are more than about 10% different in diameter to the mean particle diameter. Mixtures of different grades (e.g. different particle sizes, densities etc.) of microspheres may also be used. This may be useful in improving packing density, allowing a higher proportion of microspheres to be used in a curable mixture. This may reduce the density of the resulting cured composite. The microspheres may have a crush strength of about 35 to about 200 Mpa (about 5000 to about 30000 psi) or about 35 to 150, 35 to 100, 100 to 200, 100 to 150, 150 to 200, 50 to 150, 55 to 110, 35 to 70, 35 to 50, 50 to 100, 75 to 100 or 50 to 75 MPa, e.g. about 35, 40, 45, 50, 55, 60, 65, 70, 75, 80, 85, 90, 95, 100, 110, 120, 130, 140, 150, 160, 170, 180, 190 or 200 MPa. In some instances, crush strengths lower than these values may be used, e.g. about 5 to about 35 MPa, or about 5 to 20, 5 to 10, 10 to 35, 20 to 35, 10 to 25 or 15 to 25 MPa (e.g. about 5, 10, 15, 20, 25 or 30 MPa). These microspheres would not allow as high cure pressure (as at higher pressures a larger proportion would crush during cure), and would only be suitable for making foams for use at lower compression pressures. In this context the crush strength is the pressure required to crush about 10% of the microspheres. It may be a hydrostatic crush pressure (HCP). The microspheres may have a mean diameter of about 10 to about 200 microns, or about 10 to 100, 10 to 50, 10 to 20, 20 to 200, 50 to 200, 100 to 200, 20 to 100, 20 to 50, 50 to 100 or 15 to 30 microns, e.g. about 10, 15, 20, 25, 30, 35, 40, 45, 50, 60, 70, 80, 90, 100, 110, 120, 130, 140, 150, 160, 170, 180, 190 or 200 microns. They may have a mean wall thickness of about 0.1 to about 5 microns, or about 0.1 to 2, 0.1 to 1, 0.1 to 0.5, 0.5 to 5, 1 to 5, 2 to 5, 0.5 to 2, 1 to 2 or 0.5 to 1 micron. e.g. about 0.1, 0.2, 0.3, 0.4, 0.5, 0.6, 0.7, 0.8, 0.9, 1, 1.5, 2, 2.5, 3, 3.5, 4, 4.5 or 5 microns. Preferred microspheres may have crush strength of about 55 to 110 MPa and a true density of about 0.3 to about 0.45 g/cc. They may have wall thickness to diameter ratio of about 0.5 to about 10%, or about 0.5 to 5, 0.5 to 2, 0.5 to 1, 1 to 10, 2 to 10, 5 to 10, 1 to 5, 1 to 2 or 2 to 5, e.g. about 0.5, 1, 1.5, 2, 2.5, 3, 3.5, 4, 4.5, 5, 6, 7, 8, 9 or 10%. Suitable microbubbles include for example 3M™ glass bubbles S42XHS, which have a true density of about 0.42 g/cc and an isostatic crush strength of about 8000 psi (about 55 MPa). It is thought that the weaker hollow microspheres (i.e. those which would fail when determining the HCP) might weaken the cured epoxy composite if they were to survive the process of making the mixture. It is therefore considered preferable that such microspheres be crushed so as to become a solid (not hollow) filler in the curable mixture. It should be noted that wall thickness/diameter ratio is likely to determine the HCP of a microsphere. Weak microspheres may be any size and may be those which are of lower sphericity or have thinner walls. The higher density microspheres may simply have thick walls.

The microspheres may be graded. Thus the grading may remove microspheres over a selected size or may remove microspheres below a selected size. Smaller microspheres may have a reduced proportion of void volume, thus impairing the density reducing properties, whereas larger microspheres may have lower crush strength. These may crush during production, thereby impairing the density reducing properties.

In some instances the microspheres may be surface treated or surface coated. This may improve the interaction between the epoxy matrix and the microspheres. It may improve adhesion between the epoxy matrix and the microspheres. It may increase the strength and/or resilience and/or toughness of the composite. Suitable surface treatments include epoxysilane treatments (e.g. with glycidoxypropyltrimethoxysilane $CH_2(O)CHCH_2OC_3H_6—Si(OCH_3)_3$) in order to bond epoxy groups to the surface of the microspheres) or aminosilane treatments (e.g. with aminopropyltriethoxysilane $NH_2C_3H_6—Si(OC_2H_5)_3$) to bond amino groups to the surface of the microspheres). In other instances the microspheres are not surface treated or surface coated.

There may be more than one type of microspheres used in the invention. For example higher density microspheres may be used for improved strength in combination with lower density microspheres tier reduced density of the epoxy composite.

It may be useful to use a second filler, and optionally further fillers. Each of these, independently, may be fibrous or may be non-fibrous. Suitable non-fibrous fillers include polyolefin (e.g. polypropylene) beads or macrospheres (hollow or solid). These may have a diameter of about 1 to about 20 mm, or about 1 to 10, 1 to 5, 1 to 2, 2 to 20, 5 to 20, 10 to 20, 15 to 20, 5 to 15, 2 to 5, 5 to 10 or 10 to 15 mm, e.g. about 1, 2, 3, 4, 5, 6, 7, 8, 9, 10, 11, 12, 13, 14, 1.5 16, 17, 18, 19 or 20 mm. Macrospheres may be made from carbon or glass fiber reinforced epoxy resin over polystyrene spheres that are manufactured using rotational casting. Suitable macrospheres are available from Cumming Corporation or Matrix Composites and Engineering Ltd. These have typical properties as follows: density less than 0.4 g/cc, compressive strength over 17 MPa, compressive modulus over 0.8 Gpa. HCP (hydrostatic crush pressure) tests on the foam of the present invention indicate that it is capable of surviving a 16 mm diameter hole 12 mm below the surface without implosion. This being the case, it is clear that macrospheres may be safely added to the curable material provided they have adequate curable material about them (i.e. that there is sufficient distance between macrospheres), and still produce a cured product which can withstand the isostatic pressure for which it is designed and/or be sufficiently strong enough to maintain the required syntactic foam hydrostatic crush strength whilst making it overall less dense. Suitable fibrous fillers may be aramid fibres (e.g. Kevlar® fibres) or e-glass fibres. E-glass is an alumino-borosilicate glass with less than about 1 wt % alkali oxides, commonly used for fibre reinforcement. The second and optionally further fillers may each individually or in combination be present at about 0.1 to about 1% by weight of the curable mixture, or about 0.1 to 0.5, 0.1 to 0.2, 0.2 to 1, 0.5 to 1 or 0.2 to 0.5%, e.g. about 0.1, 0.2, 0.3, 0.4, 0.5, 0.6, 0.7, 0.8, 0.9 or 1% w/w. The fibres (if the second filler is fibrous) may have a mean fibre length of about 0.2 to about 2 mm, or about 0.2 to 1, 0.2 to 0.5, 0.5 to 2, 1 to 2 or 0.5 to 1.5 mm, e.g., about 0.2, 0.3, 0.4, 0.5, 0.6, 0.7, 0.8, 0.9, 1, 1.1, 1.2, 1.3, 1.4, 1.5, 1.6, 1.7, 1.8, 1.9 or 2 mm, or may in some cases be greater than 2 mm. The second filler may improve the tensile strength of the cured epoxy composite. It may improve its rigidity. It may improve its crack resistance. It may improve any one or more, optionally all, of these properties by at least about 5%, or at least about 10%, e.g. by about 5, 6, 7, 8, 9, 10, 11, 12, 13, 14 or 15%, relative to the same material lacking the second filler. A benefit of using aramid or other organic (e.g. polymeric, aramid etc.) fibres as the second filler is the improvement in properties with relatively minor, or in some cases no, impact on density of the final composite.

Once the components of the curable mixture have been combined, the resulting mixture is agitated, for example stirred, sufficiently (i.e. for sufficient time and at a sufficient rate) to render it substantially homogeneous. This may be for example accomplished using a mixer or stirrer. The combining (described above) and optionally also the agitation may be conducted under a non-air atmosphere. The inventor has found that a small amount of carbon dioxide in the non-air atmosphere can have a beneficial effect on the strength of the resulting cured composite. The concentration of carbon dioxide may be about 1 to about 10%, or about 1 to 5, 1 to 2, 2 to 10, 5 to 10 or 3 to 8% on a volume basis, or about 1, 2, 3, 4, 5, 6, 7, 8, 9 or 10% by volume. In some cases higher concentrations, e.g. about 10 to about 50% (or about 10 to 40, 10 to 30, 20 to 50, 30 to 50 or 20 to 40%) may be used, e.g. about 10, 15, 20, 25, 30, 35, 40 45 or 50% by volume. It is hypothesised that the presence of carbon dioxide affects the gas/mixture interface so as to reduce the size of included gas pockets. It is also hypothesised that carbon dioxide may inhibit or slow cure of the epoxy resin, thereby allowing longer time for elimination or reduction of voids (gas pockets) in the mixture prior to cure (see below). This may be a result of an effect of the carbon dioxide on the curing agent. The inventor has however found that if the concentration of carbon dioxide in the non-air atmosphere is too high (e.g. 100%), the density of the cured composite is higher than it would otherwise have been. This is a disadvantage for deep sea applications or other applications that benefit from low density of the composite, although use of 100% carbon dioxide may be suitable in cases where low density of the composite is not critical. It may be possible to replace at least a portion of the carbon dioxide with other gases which perform a similar function, e.g. sulfur dioxide, nitrogen oxides or mixtures of such gases. The remainder of the non-air atmosphere, or the majority of said remainder, may be a gas which has higher solubility in the curable mixture than does air. A suitable such gas is argon. Krypton, xenon or other chemically inert gases may also be used. The preferred gas may be a heavier than air gas. In some cases lighter than air gases may be used instead of the argon, e.g. helium. Mixtures of gases (e.g. helium/argon/carbon dioxide, neon/argon/carbon dioxide etc.) may also be used. In some cases mixtures with nitrogen may be used. The nitrogen may be in lower proportion than in air, e.g. less than about 70, 60, 50, 40, 30 or 20% by volume, or may represent about 10, 20, 30, 40, 50, 60 or 70% of the non-air atmosphere by volume. A preferred gas is one that has relatively high solubility in the curable mixture (e.g. higher solubility than air) and relatively low solubility in the cured composite (so as to allow it to leave the cured composite and thereby reduce the density of the composite). This may be beneficial in encouraging solution of the gas in the mixture prior to curing, so that any voids that are present in the mixture are able to be reduced or eliminated. It is thought that the reduction and/or elimination of gas pockets may be due in part to a simple size reduction of the gas in the pocket due to the increased pressure (under Boyle's law) and partly due to absorption of the gas in the pocket into the surrounding matrix due to increased solubility of the gas in the matrix at elevated pressure. Following cure, it is hypothesised that at least some of the dissolved gas diffuses out of the composite. This may serve to reduce the density of the composite without introducing voids. The non-air atmosphere may be heavier than air, although if suitable containment equipment is used, lighter than air gases may be used. The gas may have a density relative to air at the same pressure of at least about 1.05, or at least about 1.1, 1.15, 1.2, 1.25, 1.3, 1.35, 1.4, 1.45 or 1.5, or about 1.05 to 2, 1.05 to 1.8, 1.05 to 1.5, 1.05 to 1.3, 1.1 to 2, 1.2 to 2, 1.5 to 2 or 1.1 to 1.5, e.g. about 1.05, 1.1, 1.2, 1.3, 1.4, 1.5, 1.6, 1.7, 1.8, 1.9 or 2. The non-air atmosphere may comprise for example 90 to 95% argon (or other suitable gas as described above), or 90 to 93 or 92 to 95% argon or other suitable gas, e.g. about 90, 91, 92, 93, 94 or 95% argon or other suitable gas, by volume. It may comprise both argon and carbon dioxide. It may comprise carbon dioxide as a minor component (e.g. about 1 to 10%) and argon as a major component (e.g. about 90 to 95%). It may for example be a welding gas. In order to mix under a heavier than air non-air atmosphere, it may be sufficient to have a stream of the gas flowing over the mixture as it is being mixed, however the gas may alternatively or additionally be bubbled/sparged through the mixture. The appropriate gas flow rate will depend on the size of the mix, however representative flow rates are between about 1 and about 10 L/min, or about 1 to 5, 1 to 2, 2 to 10, 5 to 10, 2 to 5 or 2 to 3 L/min, e.g. about 1, 2, 3, 4, 5, 6, 7, 8, 9 or 10 L/min for about 2-3 kg of curable mixture. For larger quantities of curable mixture the flow rate may be proportionally higher. The mixing is commonly conducted at ambient temperature or below so as to avoid premature curing of the mixture. It may be conducted for example at about 15 to about 30° C., or about 15 to 25, 15 to 20, 20 to 30, 25 to 30 or 20 to 25° C., e.g., about 15, 20, 25 or 30° C. As discussed elsewhere, it may be below these temperatures, e.g. as low as about 0° C. It may be necessary to mix for at least about 30 minutes, or at least about 1, 2, 3, 4, 5 or 6 hours to achieve an acceptable degree of homogeneity in the curable mixture, however this will depend to some degree on the viscosity of the mixture. In some cases, shorter mixing times may be used effectively, e.g. about 1 to about 30 minutes, or about 1 to 15, 1 to 10, 1 to 5, 1 to 2, 2 to 30, 5 to 30, 10 to 30, 20 to 30, 2 to 15, 2 to 10, 2 to 5, 5 to 10 or 10 to 20 minutes, e.g. about 1, 2, 3, 4, 5, 6, 7, 8, 9, 10, 15, 20, 25 or 30 minutes.

Once the mixture has reached an acceptable degree of homogeneity, it is pressurised in order to reduce or eliminate gas pockets in the mixture. In this context "reduce" refers to a reduction in the size or volume of the gas pockets (voids). "Eliminate" refers to the gas pockets (voids) disappearing. This is thought to be at least partially due to the gas in the gas pockets (voids) being absorbed/dissolved in the curable mixture. This step is preferably conducted in such a way that the mixture is not exposed to gas (other than that entrained or dissolved in the mixture). This avoids adding further gas to the mixture which would reduce the ability of the mixture to absorb the gas present in the existing voids. The pressure may be applied substantially isostatically. A convenient means to apply pressure to the gas is to wrap it in a barrier material, immerse the wrapped mixture in a liquid and apply the desired pressure to the liquid. A simple method for wrapping the mixture is to place it in/on a film of the barrier material, fold the barrier material around the mixture so as to completely surround it and secure the ends of the barrier material e.g. by twisting and/or tying (e.g. with a cable tie, a string or some other suitable method). In this method, the barrier material may be wrapped around the curable mixture cylindrically. The ends may then be twisted (like a sausage) and then cable ties or other suitable securing devices used to secure the ends. Alternatively wrapping may be done cylindrically and alternate end secured to end wraps in at least two directions as well as additional cylindrical wraps. The barrier material may be a single layer barrier material or may be multilayer (e.g. 2, 3, 4 or 5 layer) in order to improve barrier properties. The barrier material may be folded around the curable material so as to form an approximately rectangular parallelepipedal shape. In some instances a sealing material may be used to seal the barrier material. This may be a pressure resistant adhesive, for example a butyl mastic. In other instances the barrier material may be heat sealed. The barrier material may be in the form of a six sided bolted box sealed on 4 edges by a sealant and having a top and bottom diaphragm. The diaphragm allows the applied pressure to compress the mixture inside. A further option is to use a folded polypropylene box sealed with a sealing material, e.g. double sided black butyl-mastic tape, with one or more outer layers (e.g. 1, 2, 3, 4 or 5) of PVC film welded as a tank liner and again sealed with black butyl-mastic double sided tape. The PVC liners and polypropylene box may then be placed into the six sided bolted box which is no longer sealed. In a further option the curable mixture may be placed in an open tray and sealed with a flexible membrane, which may be secured to the top edges of tray. In this option a release agent may optionally be used on the bottom and/or sides of tray. Suitable release agents include for example silicone release agents. Alternatively the tray may have a non-adhesive surface for example a fluorocarbon polymer surface. The wrapping may be a single layer wrapping. It may be a multilayer (e.g. 2, 3, 4, 5, 6, 7, 8, 9 or 10 layer wrapping). Suitably, the curable mixture may be inserted in a bag made of the barrier material. This may then be sealed, e.g. heat sealed so as to prevent ingress of the liquid in which it is compressed. The sealing may be performed such as to include as little gas as possible inside the barrier material (i.e. inside the bag). In some cases the mixture may first be wrapped and then sealed in a bag. The pressure in the liquid will then be transferred substantially isostatically to the mixture. A suitable barrier material should be flexible so as to absorb changes in dimensions of the mixture under pressure and to transfer pressure from the surrounding fluid to the mixture. It should be substantially impermeable to the liquid. It may be sufficiently strong to withstand the forces to which is subjected in use. It should also be capable (i.e. having a suitable softening and/or melting temperature) to withstand the temperature during cure of the curable mixture. Suitable barrier materials include polymeric films, for example polyethylene film, PVC film, latex film, polyurethane film, EPDM rubber etc. In the case of multilayer barrier materials, the different layers may be the same material or may be different. The wrapping should be such that, under the applied pressure, none (or negligible amounts) of the liquid penetrates to the mixture, at least until the curable mixture has cured to form the cured composite. In some instances barrier material examples may fail at below about 90° C. (e.g. may shrink, become brittle and/or deteriorate). However, by the time the mixture (and barrier materials) reach this temperature the mixture will have cured to a substantial degree (and will simply be going through a final transition phase, effectively post cure, to further increase strength) and will therefore be impervious to the liquid, so that some penetration of the liquid does not cause problems. The liquid may be aqueous (e.g. water) or may be non-aqueous (e.g. silicone fluid, mineral oil etc.) or may be some other type of liquid. The liquid may have a viscosity of about 0.5 to 200 cS, or about 1 to 200, 10 to 200, 50 to 290, 0.5 to 100, 0.5 to 50, 0.5 to 10, 0.5 to 2, 1 to 100, 1 to 50, 50 to 100, 1 to 20 or 20 to 50 cS, e.g. about 0.5, 1, 1.5, 2, 2.5, 3, 3.5, 4, 4.5, 5, 6, 7, 8, 9, 10, 1 5, 20, 25, 30, 35, 40, 45, 50, 60, 70, 80, 90, 100, 120, 140, 160, 180 or 200 cS. In some embodiments the wrapped curable mixture may be compressed by means of a gas rather than a liquid. In this case the barrier material should be substantially impermeable to the gas. It should be noted that in some instances the barrier material is not completely impervious to the surrounding liquid and some liquid may leak into the mixture located therein.

The pressure applied to the curable mixture may be approximately equal to, or may be less than, that which it is designed to withstand in use. It may about 5% to about 100% of the designed use pressure, or about 5 to 50, 5 to 20, 5 to 10, 10 to 100, 20 to 100, 50 to 100, 10 to 50, 10 to 20 or 5 to 20%, e.g. about 5, 10, 15, 20, 25, 30, 35, 40, 45, 50, 60, 70, 80, 90 or 100% of the designed use pressure. In particular embodiments it will be about 10% of the designed use pressure. It may be a pressure sufficient to rupture about 5 to about 15% of microsphere filler particles, or about 5 to 10 or 10 to 15% thereof, e.g. about 5, 10 or 15% thereof. The small proportion of microspheres that rupture may then act as a filler for imparting strength to the resulting cured composite. The pressure may be a pressure of at least about 7000 kPa (about 1000 psi) although in some cases pressures below this value may be effective, e.g. pressures of about, or of at least about, 3000, 3500 (about 500 psi), 4000, 4500, 5000, 5500, 6000 or 6500 kPa, or about 3000 to 7000, 3000 to 5000, 5000 to 7000, 4000 to 6000 or 4000 to 5000 kPa. Lower pressures may be used for making composites with lower depth rating. Such foams may have lower strength and/or lower density than those cured at higher pressures. The pressure may be at least about 7500, 8000, 8500, 9000, 9500 or 10000 kPa, or may be about 7000 to about 15000 kPa, or 7000 to 10000, 7000 to 8000, 8000 to 15000, 10000 to 15000, 8000 to 12000 or 8000 to 10000 kPa, e.g. about 7000, 7500, 8000, 8500, 9000, 9500, 10000, 11000, 12000, 13000, 14000 or 15000 kPa. If the pressure is too low, the required degree of void elimination may not be achieved, leading to a cured composite which has insufficient crush (or compressive) strength. If the pressure is too high, excessive numbers of microspheres or other particulate filler particles may be crushed or ruptured, in the event that the particulate filler particles are crushable or rupturable. This may lead to production of a cured composite that has higher than desired density, and may cause other undesirable physical properties (although it may increase the strength of the cured composite). It is estimated that a pressure of about 7000 kPa would result in a reduction in void size of at least about 70 fold, and that as gas in a void dissolves in the curable mixture, the voids may reduce substantially more than this and may disappear entirely.

In some cases the pressure may be initially applied at a temperature at which the curable mixture does not cure rapidly (e.g. does not cure within about 2 hours, or within about 3, 4, 5, 6, 7, 8, 9, 10, 11, 12, 13, 14, 15, 16, 17, 18, 19 or 20 hours). This initial compression phase may be at about room temperature. It may be at about 15 to about 30° C., or about 15 to 25, 15 to 20, 20 to 30, 25 to 30 or 20 to 25° C., e.g. about 15, 20, 25 or 30° C. This allows time to reduce or eliminate gas voids in the mixture prior to cure. The curable mixture may be compressed at the above defined temperature for about 1 to about 20 hours, or about 1 to 10, 1 to 5, 5 to 20, 10 to 20, 15 to 20 or 10 to 15 hours, e.g. about 1, 2, 3, 4, 5, 6, 7, 8, 9, 10, 11, 12, 13, 14, 15, 16, 17, 18, 19 or 20 hours. This time may be regarded as a delay time. In some cases the temperature during this phase (delay period) my be below 15° C., e.g. about 0 to about 15° C., or about 0 to 10, 0 to 5, 5 to 10 or 5 to 15° C., e.g. about 0, 5, 10 or 15° C. Lower temperature compression may be an advantage as the curable mixture will cure slower at the lower temperature, allowing longer time for voids to be reduced or eliminated (e.g. absorbed). Additionally, since gases are generally more soluble at lower temperatures, dissolution of gases in the compressed voids is encouraged at lower temperatures, allowing greater reduction of void volume.

Following the initial low temperature compression phase, the temperature may be increased to a cure temperature so as to cure the curable mixture. The temperature may be raised for example by raising the temperature of a liquid in which the curable mixture is immersed (preferably wrapped in a barrier material as described above). The cure temperature may be less than about 90° C., or less than about 80, 70 or 60° C. It may be above about 40° C., or above about 50; 60 or 70° C., or may be about 40 to 90, 40 to 80, 40 to 65, 40 to 60, 50 to 90, 70 to 90 or 50 to 80° C., e.g. about 40, 45, 50, 55, 60, 65, 70, 75, 80, 85 or 90° C. Cure temperatures of about 90° C. or over may be used in some cases, e.g. up to about 170° C., or up to about 160, 150, 140, 130, 120, 110 or 100° C., e.g. about 95, 100, 105, 110, 115, 120, 125, 130, 135, 140, 145, 150, 155, 160, 165 or 170° C. The curable mixture may be raised to and maintained at the cure temperature without reduction in pressure, i.e. while maintaining the pressure as described above. Thus following mixing, optionally under a non-air atmosphere, and subsequent wrapping in a barrier material if required, the pressure is raised to the desired pressure and maintained until the curable mixture has cured to form the cured composite. In some instances the pressure may be further increased before or during the high temperature cure phase, or it may be slightly decreased, however it should be maintained within the desired range (described above). Commonly the raised pressure is maintained substantially constant through the cure of the cured composite. The cure temperature may be maintained for sufficient time to cure the curable mixture. It may be maintained for at least about 2 hours, or at least about 3, 4, 5, 6, 7, 8, 9, 10, 11 or 12 hours, or for about 2 to 12, 4 to 12, 6 to 12, 8 to 12, 2 to 10, 2 to 6 or 6 to 10 hours, e.g. for about 2, 3, 4, 5, 6, 7, 8, 9, 10, 11 or 12 hours. The cure time will depend on the nature and ratios of the components of the curable composite (particulate filler, epoxy prepolymer and curing agent) as well as the nature, presence or absence and amount of other components such as an accelerator. The cure temperature may be one at which the cure time, or working time, of the curable mixture is less than about 1 hour, or less than about 2, 3, 4, 5, 6, 7, 8, 9, 10, 11, 12, 13, 14, 15, 16, 17, 18, 19 or 20 hours, e.g. cure temperature may be such that the working time, or cure time, is about 1, 2, 3, 4, 5, 6, 7, 8, 9, 10, 11, 12, 13, 14, 15, 16, 17, 18, 19 or 20 so hours. In certain cases a post-cure may be conducted, either before or after relief of the pressure (i.e. return to about ambient pressure). The post-cure may be under conditions (temperature, time) as defined above for the cure. It may be at the same conditions as the cure or under different conditions.

As described above, the heating may be by means of a heated liquid bath. In this case, the liquid in the bath may be recirculated to the bath through a temperature controller which maintains the desired temperature. As well as providing the required heating to raise the bath temperature to the desired cure temperature, this may also serve the purpose of removing excess heat evolved as a result of an exothermic cure reaction, so as to prevent overheating of the curing mixture. Additionally or alternatively the heating may be by means of an electric heat wire or some other suitable method.

If a step of heating is used so as to initiate cure, the epoxy composite may be cooled prior to release of the pressure. The cooling may be by removing the cured composite from a liquid in which it is immersed for heating, or it may by cooling the liquid in which it is immersed. The cured composite may be cooled to room temperature before release of the pressure, or may be cooled to a temperature of less than or equal to about 40, 35, 30, 25 or 20° C., or to a temperature of about 40, 35, 30, 25 or 20° C. In some instances it may be cooled to a temperature of 45, 50, 55, 60, 65 or 70° C. before release of the pressure. The latter ranges are more common with larger samples of product, since the time required to cool is considerably longer for such large samples.

In summary, a suitable process for making the epoxy composite of the invention comprises the following steps. Suggested timing below is suitable to make about 1-2 kg of cured epoxy composite, but may require different (e.g. longer) times for larger batches and larger batches may require a somewhat modified process.
- an epoxy prepolymer and curing agent are mixed under a non-air atmosphere (e.g. while sparging with the non-air atmosphere), commonly for about 3-4 minutes;
- hollow glass microspheres are then added to the combined prepolymer/curing agent. This may involve adding two or more different grades of microsphere. In this case the higher (highest) strength or higher (highest) true density microspheres may be added first. The resulting curable mixture is then mixed under the non-air atmosphere for about 5 minutes until homogeneous. The total time for this and the previous mixing step, including addition times, may be about 10-15 minutes.
- the curable mixture is then wrapped in a polymer film. This may involve lining a mould with the film, adding the curable mixture to the lined mould and then completing the wrapping. The wrapped mixture may then be inserted into a bag made from a heat sealable plastic film which is then heat sealed to further protect the mixture. The wrapping and sealing in the bag should be conducted with inclusion of as little gas (air or non-air atmosphere) as possible inside either the wrapping or the sealed bag.
- the wrapped mixture is then immersed in a liquid, for example water or low viscosity silicone fluid, and compressed hydrostatically to the desired pressure (about 7 to about 15 MPa). This pressure is maintained for about 6-8 hours at around ambient temperature or below (commonly about 10 to about 25° C.).
- the temperature is then raised to the desired cure temperature (commonly about 50-90° C.) while maintaining the pressure. The time to raise the temperature may be about 4-6 hours. The elevated temperature and pressure are then maintained for about 6-8 hour in order to cure the mixture to form the composite. A post-cure step at about 120° C. for about 1-3 hours is optional.
- the cured composite is then allowed to cool to near ambient temperature (typically about 20-40° C.) while maintaining the elevated pressure.
- once the temperature of the composite has returned to near ambient, the pressure may be removed.

After the epoxy composite has been made, as described above, it may be formed, e.g. cut, sawed, machined, milled, abraded, ground etc., to a desired shape. It may be formed into blocks, bricks, slabs or other convenient shape. It may be formed, for example, into a suitable shape for constructing a structural part or component for a deep sea submersible vehicle. Alternatively, the curable mixture may be moulded into a desired shape prior to cure, so that it cures to form pieces of the curable composite in the desired shape. In use, blocks or other shapes of the composite may be adhered together, for example to construct a structural beam. The adhesive may be an epoxy adhesive. It may be a high strength epoxy adhesive. It may be a filled epoxy adhesive. It may be a microsphere-filled epoxy adhesive. The microspheres may be polymeric, glass or ceramic microspheres. If glass microsphere filled epoxy adhesive is used, the epoxy and/or the microspheres may be as described elsewhere herein. The epoxy and/or the microspheres may, independently, be the same as that used in making the composite, or may be different. In use the structural shell of composite may have a coating or covering. This is may be a plastic coating or covering. It may be a fabric coating or covering. It may be a protective coating or covering. It may comprise for example a filled (e.g. boron fibre, Kevlar® fibre and/or carbon fibre filled) polymeric coating or covering. It may comprise a fibrous fabric coating or covering, for example comprising boron fibres, Kevlar® fibres and/or carbon fibres or polyester or polypropylene cloths. The coating or covering may be in the form of a flexible film. The coating or covering may be laminated to the epoxy composite. It may be sufficiently flexible that it does not readily delaminate in use. The coating or covering may assist the composite in surviving the high pressures encountered in use.

An epoxy composite according to the present invention may have an ultimate stress under compression (or crush strength) of greater than or equal to 100 MPa (about 14500 psi), or greater than or equal to about 105, 110, 110 or 120 MPa, or of about 100 to about 120 MPa, or about 100 to 110, 100 to 105, 105 to 120 or 105 to 110 MPa, e.g. about 100, 101, 102, 103, 104, 105, 106, 107, 108, 109, 110, 111, 112, 113, 114, 115, 116, 117, 118, 119 or 120 MPa. The ultimate stress described above relates to the applied stress at which the composite fails. Commonly this is a catastrophic failure, in which the sample shatters. The composite may have a compressive modulus such that, at a pressure of 110 MPa (or at the limit of its crush strength, whichever is less), it exhibits strain of less than or equal to about 3%, or less than or equal to about 2.5, 2, 1.5, 1, 0.95, 0.9, 0.85, 0.8, 0.75, 0.7, 0.65, 0.6, 0.55 or 0.5%. It may exhibit linear distortion of less than or equal to about 1.3% under hydrostatic compression pressure of 110 MPa, or less than about 1.2, 1.1, 1, 0.9, 0.8, 0.7, 0.6 or 0.5, e.g. a linear distortion of about 0.2, 0.3, 0.4, 0.5, 0.6, 0.7, 0.8, 0.9, 1, 1.1, 1.2, or 1.3%. By comparison, commercial syntactic foams typically exhibit compressive strain (or linear distortion) of about 1.4% or greater under similar conditions. By use of suitable microspheres as a particulate filler (as described earlier), a density of less than about 0.8 g/cc may be achieved with the strength and modulus values described above, or a density of less than about 0.75, 0.7, 0.65 or 0.6 g/cc or of about 0.5 to about 0.8 g/cc or about 0.5 to 0.7, 0.5 to 0.6, 0.6 to 0.8 or 0.6 to 0.7 g/cc, e.g. about 0.5, 0.55, 0.6, 0.65, 0.7, 0.75 or 0.8 g/cc. The epoxy composite may have a low water absorption. It may have an equilibrium water absorption of less than about 0.5% w/w, or less than about 0.1% w/w. This may be measured at about atmospheric pressure or at a pressure of about 100 MPa, or at a pressure of about 110 MPa, or at a pressure of about 125 MPa. The water absorption may be less than about 0.4, 0.3, 0.2, 0.1, 0.05, 0.02 or 0.01%, or may be about 0.01, 0.02, 0.03, 0.04, 0.05, 0.06, 0.07, 0.08, 0.09, 0.1, 0.15, 0.2, 0.25, 0.3, 0.35, 0.4, 0.45 or 0.5% w/w. By comparison, previously known syntactic foams have water absorption of about 3% by weight at about 18000 psi (about 125 MPa). The above water absorption values are measured at ambient temperature, e.g. at about 20 or 25° C. The cured composite may have a tensile strength of greater than about 20 MPa, or greater than about 25, 30, 35 or 40 MPa, or about 20 to about 50 MPa, or about 20 to 40, 30 to 50 or 30 to 40 MPa, e.g. about 20, 25, 30, 35, 40, 45 or 50 MPa.

The cured composite may have a modulus under compression of at least about 2 GPa, or at least about, or about 2 to about 9 GPa, or about 2 to 8, 2 to 6, 2 to 4, 3 to 8.5, 5 to 8.5, 7 to 8.5, 4 to 8, 6 to 8, 4 to 6, 2 to 3, 3 to 4, 2.5 to 4 or 2.5 to 3.5 GPa. It may have a modulus of about 2, 2.5, 3, 3.5, 4, 4.5, 5, 5.5, 6, 6.5, 7, 7.5, 8 or 8.5 GPa. It may have this modulus at a strain of up to about 3%, or up to about 2.5, 2, 1.5, 1, 0.5 or 0.1%.

An important aspect of the composite described herein is the combination of high crush strength (i.e. compressive strength) with low density, making it suitable for deep sea structural applications. Other properties that may be combined with this combination include high crack resistance, low compressibility (i.e. high compressive modulus), high rigidity and homogeneity of physical properties throughout a large block of composite. Important aspects of the process that enable these products to be achieved include:

- selection of appropriate raw materials, in particular low density fillers and optionally a second (commonly fibrous) filler: the particular grade of raw material may be important in achieving acceptable properties;
- use of appropriate component ratios so that the uncured mixture has sufficient viscosity to prevent separation of components (particularly fillers);
- use of a prepolymer and curing agent combination which allows for very slow cure at ambient temperatures and relatively rapid cure at elevated temperatures. In certain cases, this allows cure on demand. In large blocks the mixture may cure without external heating because of a very slow increase in temperature which has been observed to increase at around 50° C. It is thought that this may be because of the insulation properties of the glass or simply the mass of epoxy. For smaller blocks, heat loss from the mixture can overcome the exotherm, so that external heating is required in order to cure the mixture, providing cure on demand;
- mixing under an appropriate non-air atmosphere so that any entrained gas bubbles/pockets may reduce in size and/or be absorbed into the mixture under compression;
- compression of the curable mixture at a temperature at which cure is very slow, this compression being for sufficient time to allow for absorption of gases into the mixture prior to cure;
- external application of heat in order to accelerate cure and to reduce temperature gradients within the curing mixture. The external heat application also provides a post-cure for the resin. The epoxy resin commonly requires 8 hrs at 80° C. to reach its optimum HDT (heat distortion temperature) which the inventor considers is better conducted under elevated pressure. Thus the external heat application may trigger/accelerate cure, reduce temperature gradients and provide a post-cure cycle for the curing mixture.

The cured composite of the invention, particularly when made with hollow microspheres as a particulate filler, may be suitable for use in deep sea applications. It may be capable of withstanding the pressures operating at the deepest part of the ocean (about 11000 m). It may be capable of resisting hydrolysis in seawater at the pressures operating at this depth. It may be buoyant in seawater. It may be suitable for use as a flotation element and/or as a structural element at that depth. It may for example be suitable for use as in the outside surface of a submersible vehicle to be used at the deepest part of the ocean, and may additionally provide buoyancy in that application. It may be suitable for use as a jacket for deep sea oil risers. It may have thermal properties and/or acoustic properties suitable for deep sea applications. It may have any combination of the above properties suitable for the application in which it is to be used.

For use in aqueous environments, low water absorption may be a benefit. The composite of the invention may have a water absorption of less than about 0.5% under the conditions of use (for example up to 11000 m depth of water), or of less than about 0.4, 0.3, 0.2 or 0.1% on a weight basis, or of about 0.05, 0.1, 0.15, 0.2, 0.25, 0.3, 0.35, 0.4, 0.45 or 0.5%. At a depth of about 11000 m in seawater, the pressure is about 16500 psi (about 114 MPa). At these pressures, the water absorption of the cured composite described herein may be zero or may be negligible. It is thought that the particular manufacturing process, in which the composite is cured under high pressure, coupled with the high level of particulate filler (which leaves relatively small quantities of potentially water absorbing organic matrix) provide this excellent water absorption property.

The use of microspheres, particularly glass microspheres, as a particulate filler in the cured composite may also serve to increase the thermal insulation and/or acoustic insulation properties of the composite, which may be of benefit in certain applications.

In a particular embodiment, the epoxy composite of the present invention is manufactured using hollow glass microspheres with epoxy resin. But, unlike other syntactic materials, the present composite is of 'isos' or equal strength (iso as a prefix, from the Greek word 'isos' meaning equal). Equal (or uniform) properties are achieved by adopting a special manufacturing process that is different to the prior art. The following is a guideline to a suitable process for making the epoxy composite of the invention:

A high packing density of hollow glass micro-spheres to epoxy resin is chosen so the mix becomes plastic or quasi-solid. The lightweight hollow glass micro-spheres that would normally migrate and float to the surface in liquid are less able to migrate as quickly in a plastic or high viscosity mix.

The hollow glass microsphere and epoxy resin mixture is mixed and packed into a mould under an artificial atmosphere. A 5% $CO_2$ with argon atmosphere is suitable as both gases are easy to obtain (either separately and/or already mixed as a welding gas). Also, as both gases are heavier than air, it easy to create an artificial atmosphere over the microsphere/resin mixture by using simple equipment, for example a flow meter and open hose. Similar results are expected with other gases and/or mixture of other gases including lighter than air gases with special mixing and packing spaces to contain the artificial atmosphere(s).

The packed mix is then sealed in an air and liquid tight packaging. Wrapping in several layers of 'cling' type film, sealed plastic bags or special flexible mould liners have been used successfully.

The now sealed mix is placed into a pressure vessel and pressurized with liquid. A non-hazardous, thermally conducting liquid such as water is suitable, however other liquids may also be used. The pressure is chosen depending on a number of factors such as the HCP (hydrostatic crush pressure) of the hollow glass microspheres, packing density, etc. The ideal pressure will collapse weak hollow glass micro-spheres that are undesirable without causing over-packing such that stronger, hollow glass microspheres get crushed by physical contact with each other.

Delayed curing of the epoxy resin is highly preferred so as to allow as much of the entrained gas that is present in the mix to be absorbed into the liquid epoxy resin (already mixed with the curing agent). The hydrostatic pressure is maintained during the resin setting and any additional post cure cycle, including return to ambient temperature before it is release from pressure.

The various features of the above process, including selecting the right packing density, hollow glass micro-sphere type, epoxy resin system, artificial atmosphere gasses, applied hydrostatic pressure, cure temperature and cure cycle times are all important to the process. It is more a collaborative process that produces the syntactic with the best results.

The inventor hypothesises that $CO_2$ can change the surface tension of the epoxy resin and/or it may act as a retardant to allow the epoxy resin to stay liquid longer. Both of these effects would allow more gas to be absorbed into the liquid epoxy resin before it gels or sets into a solid. Argon acts as a diluent to the $CO_2$, as the inventor has found that too much $CO_2$ on the epoxy resin may have an adverse effect, and may be more absorbent into the liquid epoxy resin than air.

In prior art processes, hollow glass micro-spheres and epoxy resin are commonly mixed to a slurry then poured into moulds to cure. Higher quality foams are mixed under vacuum conditions to minimize air entrapment and poured carefully to avoid further air entering the mix. Trapped or entrained air is not desirable as it reduces HCP (hydrostatic crush pressure) and stiffness (measured in strain) but does increase floatation and insulation so some air/gas in the mix has traditionally been accepted.

The hollow glass microspheres/epoxy resin system was considered potentially suitable for the application, however mixing ingredients under a vacuum was considered difficult and undesirable. Other low density and hollow fillers were considered but hollow glass micro-spheres offer the highest crush strength to density ratios than other types. As well, other binding agents were considered but epoxy resin systems have a distinct advantage with best compressive strength to density ratios and are virtually impervious to water ingress.

In order to overcome the need to mix under vacuum, the inventor developed a process involving mixing ingredients at much higher packing densities and then isostatically pressing the mixture in a pressure vessel and allowing it to cure at pressure. It was thought that this would create substantially air free foam (or at least foam having reduced amounts of air) as any air spaces would be made smaller by compression (Boyle's law) and would be absorbed into the liquid epoxy resin before it sets (Henry's law). It should be recognised that "air free" in this context refers to air outside microspheres, since clearly the process does not affect air trapped within the microspheres. The inventor considered that any compressed/absorbed air would decompress out of the cured composite and not cause problems. There is no direct evidence that this in fact occurs, however the air has not posed a concern.

A large number of cured composites were prepared with different packing densities of hollow glass micro-spheres to epoxy resin, following recommended post cure cycles and using different isostatic pressures. Higher packing densities of the particulate filler were found to provide for more uniform foam to be produced, since, in high packing density mixes the hollow glass microspheres are unable to migrate if the mixture is mixed to a dough like consistency. This is important step in obtaining foam of uniform density and strength.

Initially the foams produced (mixing in air) appeared to be void free, however it became evident that large pockets of air were not absorbed into the epoxy resin and became trapped in the foam. Bend tests revealed specimens broke in tension near these explosive pockets of trapped air, which were under pressure in the cured composite. The voids were distinguishable by a brownish mark so any light brown mark discovered when machining was treated as a suspect void (even though not obvious to the eye). There seemed to be more voids than was considered desirable, even though HCP (hydrostatic crush pressure) tests results were acceptable. These foams were found to have poor properties under tension.

In order to address the problem with compressed gas voids, the ingredients were mixed under various gases that were heavier than air. This was relatively easy to achieve as the only equipment required was a source of the gas, a flow meter and a short hose. The gas was expected to stay in the mixing bowl subject to currents and further containment. The mixes which were mixed under non-air atmospheres were then isostatically compressed in a pressure chamber similarly to the 'mixed in air' samples.

The following effects were observed using different gases:
mixing under $CO_2$ produced void free foam but an adverse reaction to the curing agent in the epoxy resin system was noticed: samples mixed under this gas were denser than expected although maintained good HCP;
mixing mixed under 100% argon produced smaller voids identifiable by smaller brown marks, again with good HCP;
a welding gas with 5% $CO_2$, 2.5% $O_2$ by volume and remainder argon was tested. Results to date have been void free foam and exhibited no significant increase in density.

From above mixes under various gases, it appears that $CO_2$ in small concentrations may retard the curing of the epoxy resin (not so for large concentrations) and/or may alter the surface tension of the liquid epoxy sufficiently to allow more gas (or quicker exchange of gas) to be absorbed into the epoxy resin before it sets. During these trials it was found that delayed on-set of the post-cure temperature also reduced voids. It is thought that this may provide more time for the gas to be absorbed before full cure of the epoxy resin.

Thus the present invention incorporates using a gas to alter the properties and/or curing of an epoxy resin to help absorb entrained gas in a mixture which is then placed under isostatic pressure to fully cure.

FIG. 1 summarises a suitable process according to the present invention, as described earlier.

Figure 2A:
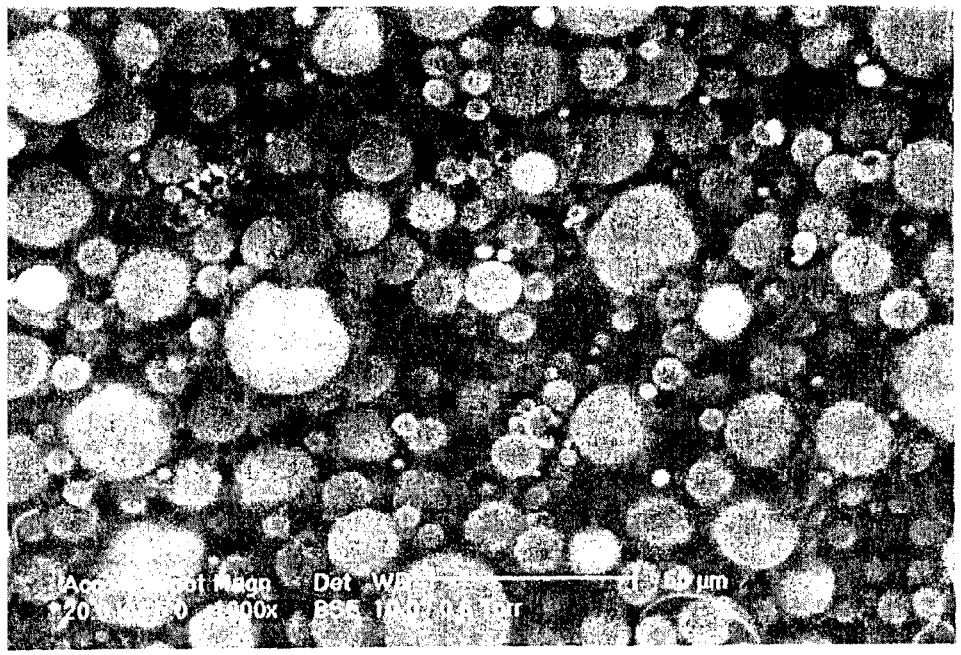
FIG. 2 shows electron micrographs of a) broken section and b) polished section of a cured composite filled with glass microspheres and prepared according to the present invention.
Figure 2B:
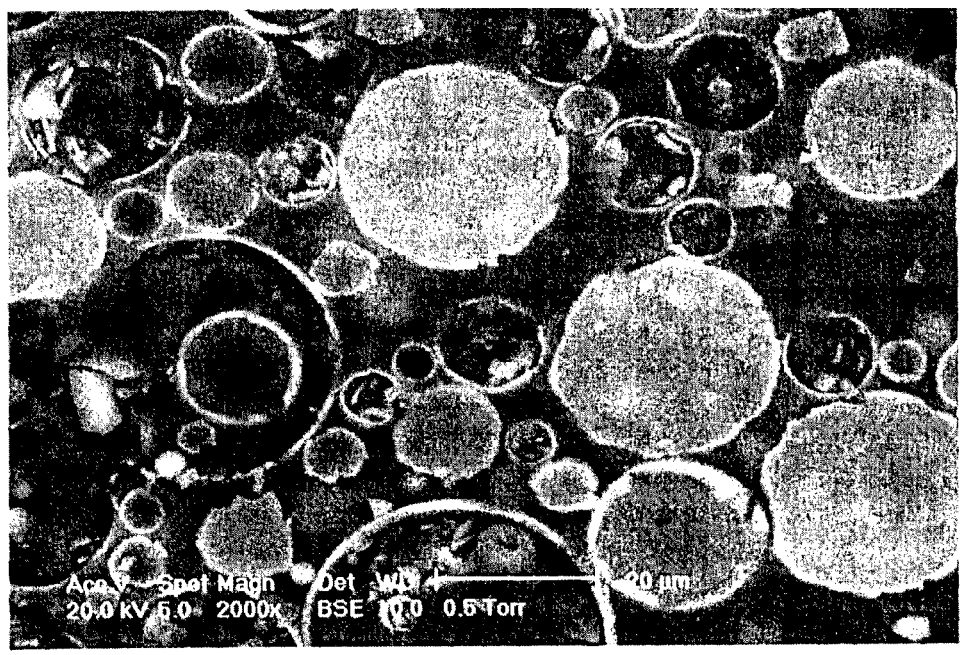

FIG. 2 shows electron micrographs of both broken and polished sections of the composite. In the broken section (FIG. 2a) voids may be seen where microspheres pulled out during breaking.

Figure 3:
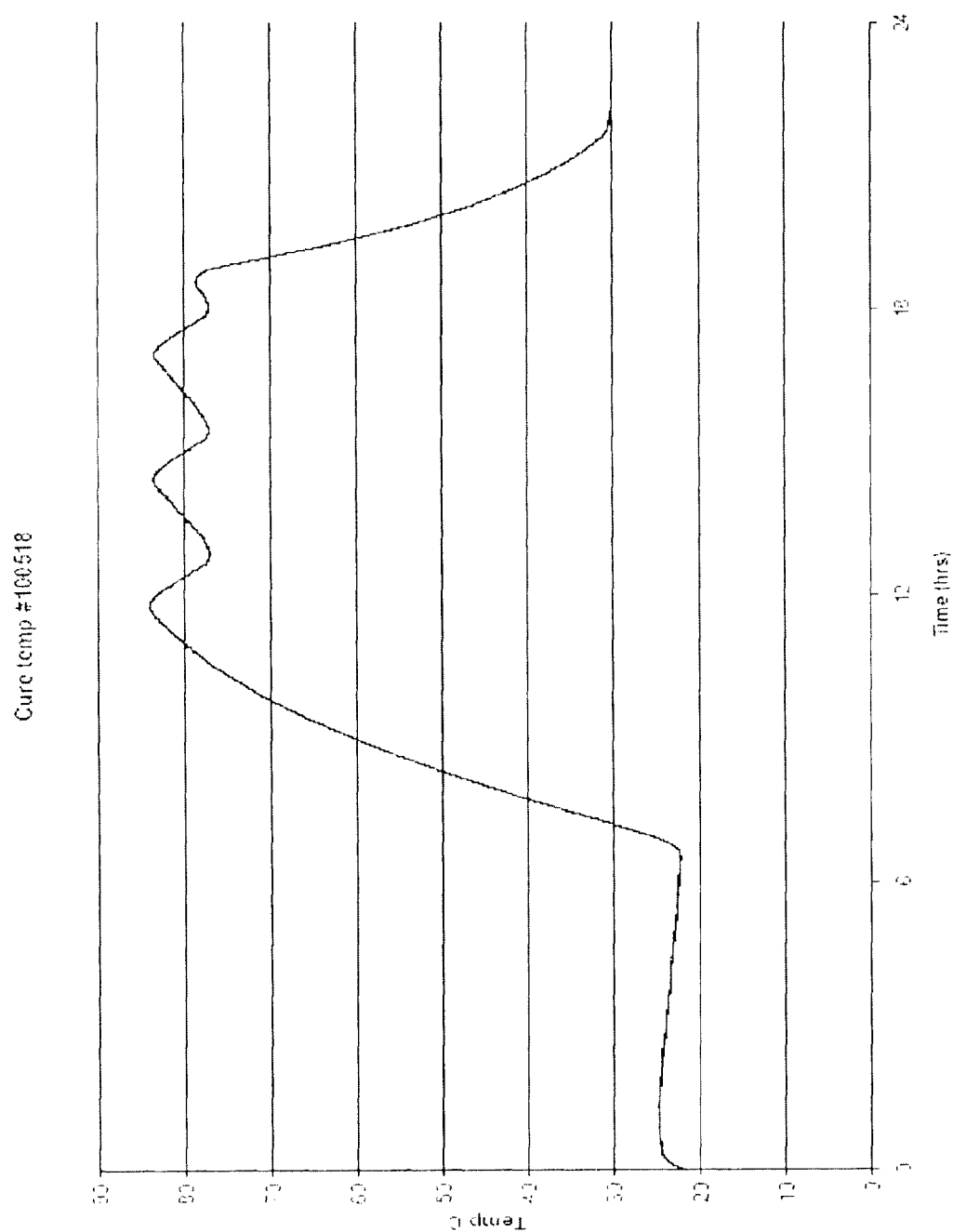
FIG. 3 shows a representative temperature profile of the process of the invention.

FIG. 3 illustrates a representative temperature profile during the high pressure steps of the process described herein. An initial slight rise in temperature may be due to a slight cure exotherm, however in the absence of external heating, the temperature remains largely constant at around 22-25° C. After about 6 hours, external heating is commenced, and about 5-6 hours are required to reach the final temperature of about 80° C. Fluctuations in the temperature may be due to variations in the bath temperature due to "hunting" of the thermostat, and/or may be due to other causes, such as instability due to so the cure exotherm. After about 6 hours of high temperature cure, the composite is allowed to cool to about 30° C., which takes about 4 hours. At this point, the cured composite is ready for decompression.

Selection of Hollow Glass Microspheres

Figure 5:
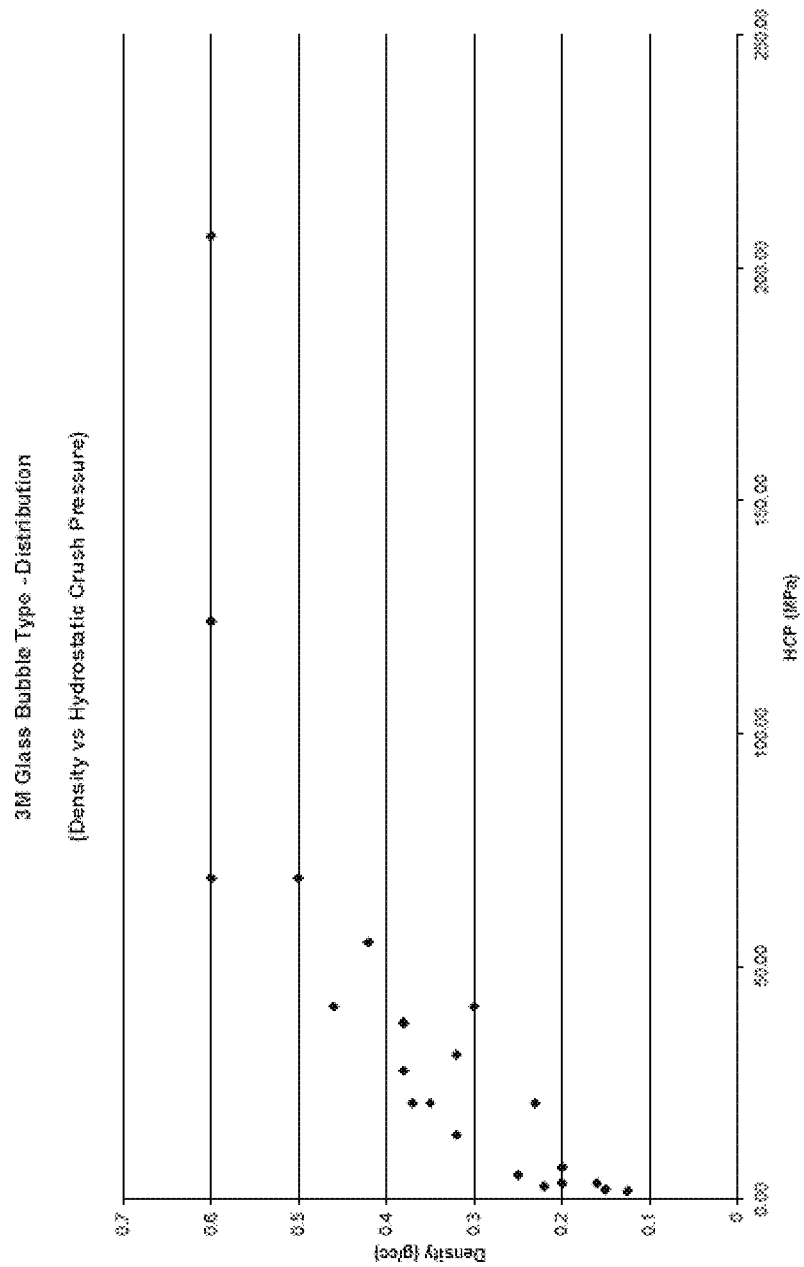
FIG. 5 is a graph showing density (g/cc) vs hydrostatic crush pressure HCP (MPa) for various commercial glass microspheres.

Hollow glass micro-spheres may be obtained commercially from any suitable manufacturer. It was found that microspheres made by 3M™ were particularly suitable. 3M use the term 'glass bubbles' for hollow glass microspheres. FIG. 5 shows a graph which plots available 3M glass bubbles showing HCP (hydrostatic crush pressure) against true bubble density. From FIG. 5 it is clear that increasing HCP comes at the expense of increased density—the correlation appears roughly linear up to HCP of about 80 MPa, although above that it appears possible to increase HCP without substantial increase in density. The ideal microsphere liar deep sea applications would lie in the bottom right of the graph (low density/high HCP) however these products are at present unavailable commercially. The table below provides the data from FIG. 5 together with identification of the particular grades of microsphere tested.

| Glass Bubbles (3M Type) | HCP (MPa) | Density (g/cc) | HCP (PSI) |
| --- | --- | --- | --- |
| A16/500 | 3.45 | 0.16 | 500 |
| A20/1000 | 6.89 | 0.2 | 1000 |
| D32/4500 | 31.03 | 0.32 | 4500 |
| H20/1000 | 6.89 | 0.2 | 1000 |
| H50/10000 EPX | 68.95 | 0.5 | 10000 |
| iM30K | 206.84 | 0.6 | 30000 |
| K1 | 1.72 | 0.125 | 250 |
| K15 | 2.07 | 0.15 | 300 |
| K20 | 3.45 | 0.2 | 500 |
| K25 | 5.17 | 0.25 | 750 |
| K37 | 20.68 | 0.37 | 3000 |
| K46 | 41.37 | 0.46 | 6000 |
| S22 | 2.76 | 0.22 | 400 |
| S32 | 13.79 | 0.32 | 2000 |
| S35 | 20.68 | 0.35 | 3000 |
| S38 | 27.58 | 0.38 | 4000 |
| S38HS | 37.92 | 0.38 | 5500 |
| S38XHS | 37.92 | 0.38 | 5500 |
| S42XHS | 55.16 | 0.42 | 8000 |
| S60/10000 | 68.95 | 0.6 | 10000 |
| S60XHS | 124.11 | 0.6 | 18000 |
| XLD3000 | 20.68 | 0.23 | 3000 |
| XLD6000 | 41.37 | 0.3 | 6000 |

From FIG. 5 and the above table it appears that the most efficient glass bubbles are the K1 for low pressure applications, XLD3000 and XLD6000 for somewhat higher pressure applications, and iM30K for extreme pressure applications. Whereas iM30K is not specifically manufactured for use in syntactic foam manufacture, it nevertheless is an efficient glass bubble for use in this application. A glass bubble material (possibly tailor made) of 0.4 g/cc density and about 12,000 psi (about 83 MPa) crush strength appears from FIG. 5 to be suitable. XLD6000, iM30K and S42XHS glass bubbles were selected for testing.

Selection of a Suitable Epoxy Resin System

Neat specimens of the following epoxy resin types were tested for density and compressive strength;

| KINETIX ® R118 | ATL Composites R118 epoxy with curing agent H103 |
| --- | --- |
| KINETIX ® R246 | ATL Composites R246 epoxy with curing agent H128 |
| KINETIX ® R240 | ATL Composites R240 epoxy with curing agent H341 |
| Epiglass ® HT9000 | Epiglass ® HT9000 with standard curing agent HT9002 |
| L285 | Hexion Chemicals L285 epoxy with curing agent L285 |
| 862L6 | Hexion Chemicals Epon ® 862 with Lindau curing agent Lindride ® 6 |
| 862LS-81K | Hexion Chemicals Epon ® 862 with Lindau curing agent LS-81K |

Figure 4A:
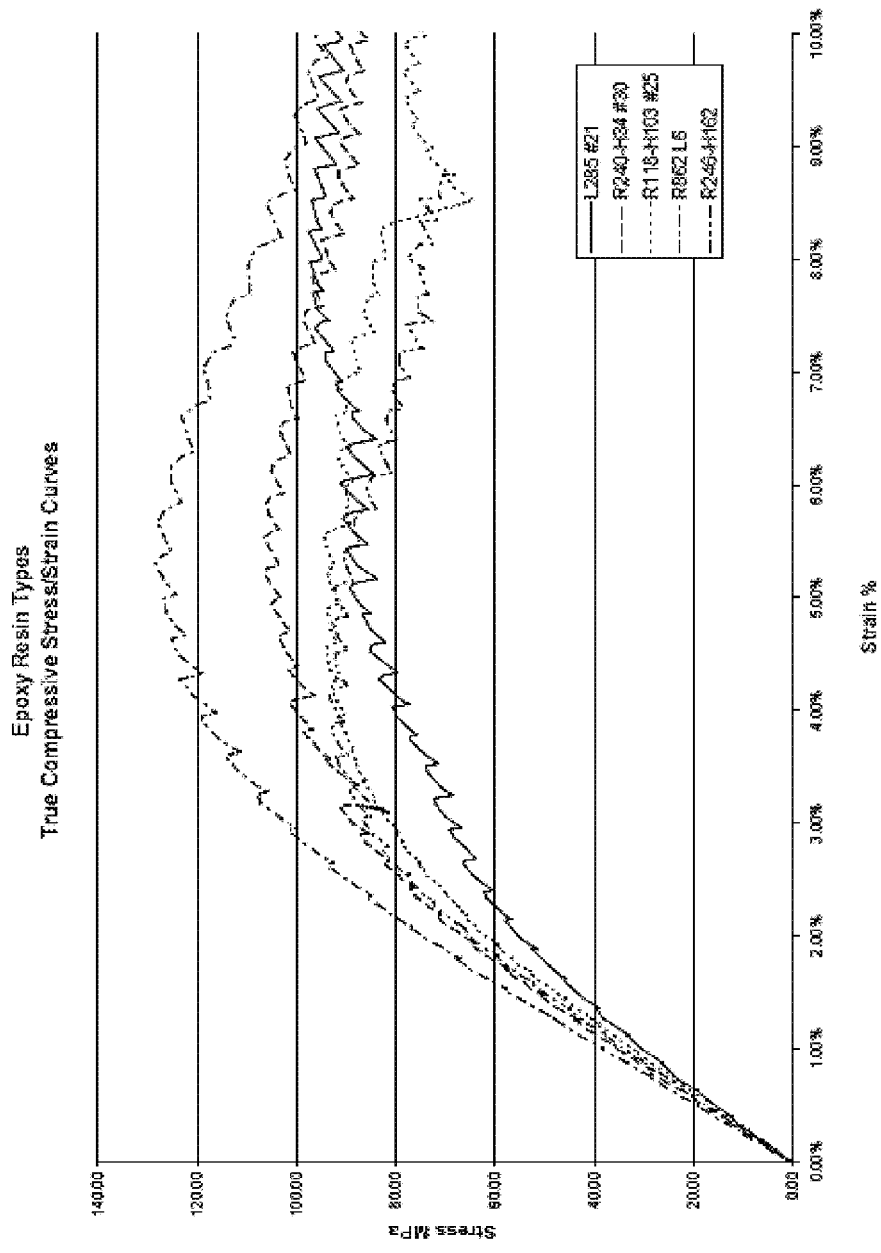
FIG. 4 shows properties of various epoxy resins which were set and cured under compression: a) compressive stress strain curves; b) compressive modulus; c) Poisson ratio.
Figure 4B:
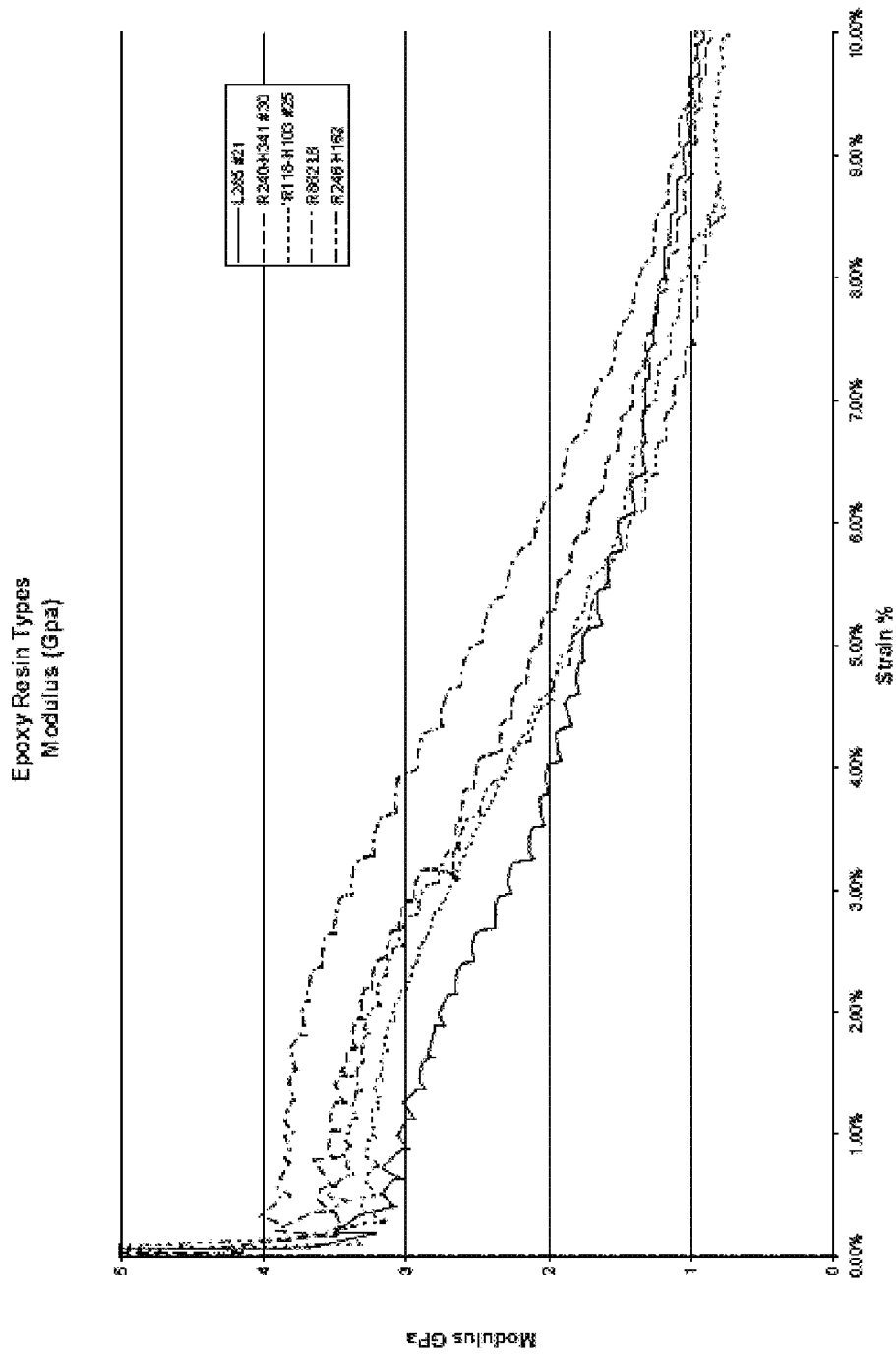
Figure 4C:
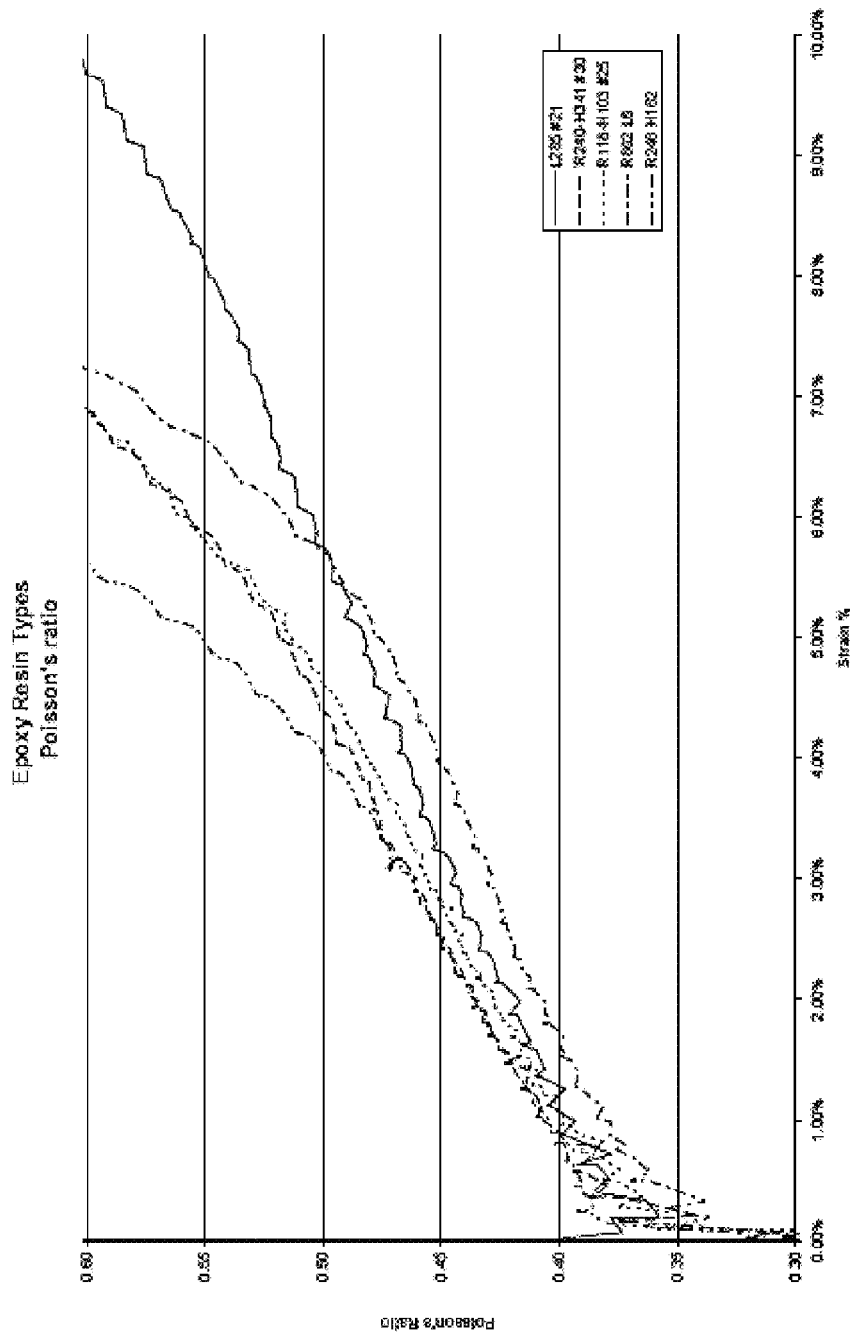

Stress-strain curves under compression are shown in FIG. 4. Thus FIG. 4 illustrates properties of various epoxy resins which were cured under elevated pressure. FIG. 4a shows compressive stress-strain curves, indicating that the materials were capable of withstanding compressive stress of over 80 MPa, and in one case over 120 MPa. FIG. 4b shows the modulus values derived from the curves of FIG. 4a. Initial modulus was between about 3 and 4 GPa, but dropped when strain was over about 2% (corresponding to stress of about 60-80 MPa). It appears from these values that the region in which these materials are reasonably elastic is up to at least about 2% strain. FIG. 4c shows Poisson ratio corresponding to the curves of FIGS. 4a and 4b. Poisson ratio is seen to increase approximately linearly up to at least about 4%, and the linearity of the Poisson ratio appears to increase with decreasing maximum stress rating.

The following densities were measured:

| R118 | 1.130 g/cc |
| --- | --- |
| R246 | 1.136 g/cc |
| R240 | 1.185 g/cc |
| HT9000 | 1.166 g/cc |
| L285 | 1.172 g/cc |
| 862L6 | 1.235 g/cc |
| 862LS-81K | 1.217 g/cc |

Making Specimens

In a representative process, the recommended ratio of epoxy resin and curing agent was mixed with glass microspheres to achieve a microsphere concentration of about 66-67% by volume in the mixture. Mixing was conducted under a flow of welding gas comprising 2% oxygen, 5% carbon dioxide and 93% argon for sufficient time to achieve a homogeneous mixture of paste-like consistency. The mixture was wrapped in flexible plastic film and immersed in liquid at room temperature. A pressure of about 1500 psi (about 10,300 kPa) was applied to the liquid in order to pressurise the mixture. The pressure was maintained for about 15 hours and the temperature then raised (while maintaining the same pressure) to about 80° C. This temperature and pressure was maintained for about 8 hours after which the resulting cured composite was cooled to about room temperature before the pressure was released.

Whilst increased compressive strength of an epoxy resin can increase HCP of syntactic loam, the effect of increased epoxy resin strength when the HCP of the syntactic is above the compressive strength of the epoxy is not large. The disadvantage of increased compressive strength of the epoxy resin is that it commonly coincides with increased epoxy resin density. The densities of the epoxy resins described above fall within a range of less than 0.105 g/cc. Of the resins tested the effect on syntactic buoyancy can be greater than 2 lbs/cuft (0.032 g/cc) at high glass bubble packing densities.

Figure 6:
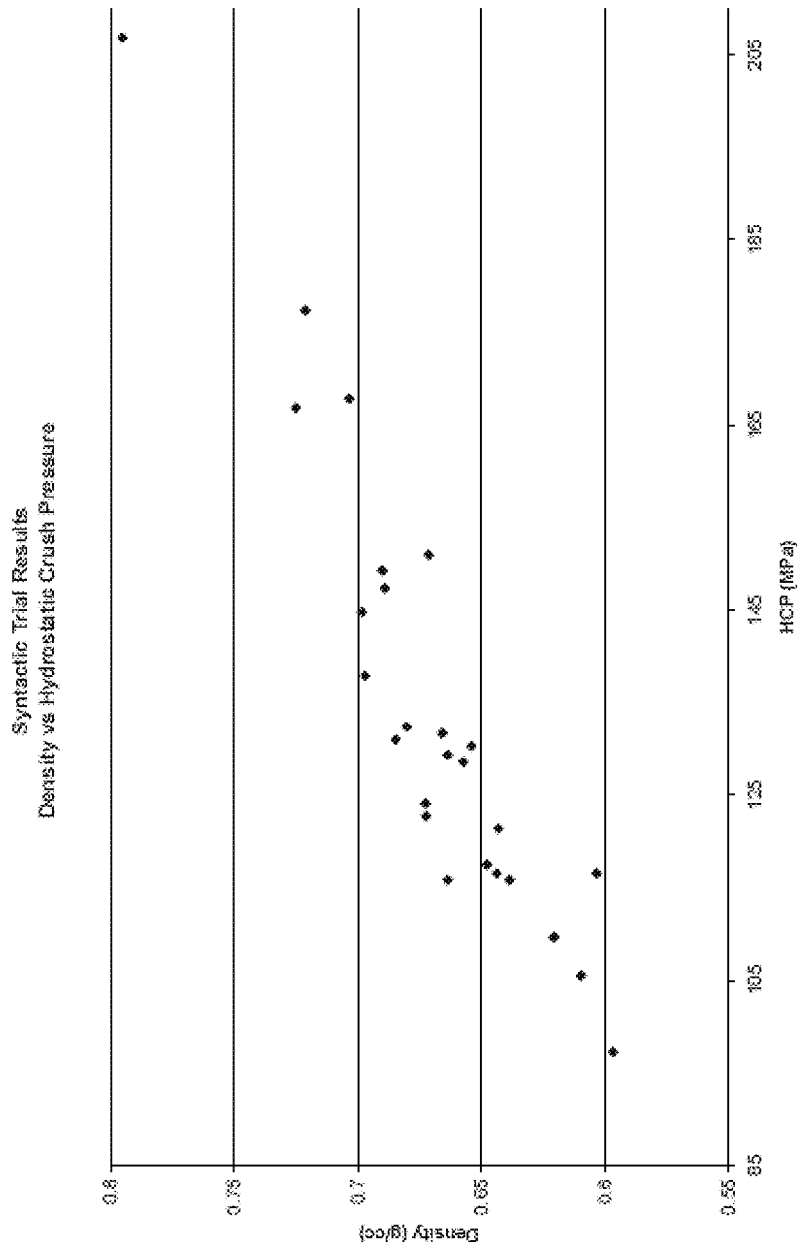
FIG. 6 shows data for a series of filled composites according to the present invention.

FIG. 6 shows a graph which plots syntactic foam HCP and density that have been manufactured using different glass bubble grades at various packing densities with different epoxy resins. From these results, it appears that glass bubble packing density and different epoxy resins do alter syntactic foam density and HCP but it is mainly the HCP of the glass bubble that determines the HCP of the syntactic foam. The table below shows the data (HCP, density and strain (µε)) for FIG. 6, which identities the foams (by proportion of microspheres, nature of microspheres and nature of epoxy resin).

| % glass bubbles, bubble type and epoxy resin type | HCP (Mpa) | Density (g/cc) | µε at 114 MPa % |
|---|---|---|---|
| 68 iM30K R118 | 206.8427 | 0.795297 | −0.84 |
| 60 XLD R240 | 124.1056 | 0.672658 | −1.03 |
| 60 XLD R240 | 132.3793 | 0.680128 | −1.09 |
| 33 iM30K 33 S42 R118 | 166.8531 | 0.725107 | −0.84 |
| 62 S42XHS R118 | 137.8951 | 0.697111 | −0.94 |
| 66 S42XHS R246 | 150.9952 | 0.671396 | −0.96 |
| 32 iM30K 32 XLD R246 | 144.7899 | 0.698383 | −0.86 |
| 61 XLD R246 | 131.0004 | 0.684823 | −1 |
| 9 iM30K 54 XLD R240 | 130.3109 | 0.653948 | −1.05 |
| 61 XLD R118 | 109.6266 | 0.62063 | −1.12 |
| 63 XLD R118 | 105.4898 | 0.609826 | −1.12 |
| 65 XLD R118 | 97.21608 | 0.596809 | −1.12 |
| 61 XLD R240 | 129.3456 | 0.663678 | −1.05 |
| 63 XLD R240 | 122.7267 | 0.67249 | −1.05 |
| 61 XLD L285 | 115.8319 | 0.638555 | −1.17 |
| 63 XLD L285 | 115.8319 | 0.663587 | −1.17 |
| 61 XLD R246 | 116.5214 | 0.603609 | −1.29 |
| 59 XLD R246 | 121.3477 | 0.643174 | −1.15 |
| 59 XLD R118 | 116.5214 | 0.643878 | −1.13 |
| 58 XLD R118 | 117.4867 | 0.647853 | −1.11 |
| 59 XLD L285 | 128.5872 | 0.65742 | −1.14 |
| 58 XLD L285 | 131.6899 | 0.665804 | −1.13 |
| 10 iM30K 57 S42 R118 | 147.3754 | 0.689103 | −0.87 |
| 10 iM30K 57 S42 R118 | 149.2853 | 0.690064 | −0.81 |
| 20 iM30K 47 S42 R118 | 167.846 | 0.703526 | −0.8 |
| 30 iM30K 37 S42 R118 | 177.3469 | 0.721154 | −0.89 |
| 10 iM30K 57 S42 R118 Argo | 160.1169 | 0.697596 | −0.92 |

Main Results Include:
XLD6000—syntactic foam made with XLD6000 glass bubbles met target densities. Foams were made with HCP ranging from about 96 MPa to 132 MPa. Although quite efficient for limited depth applications, these values of HCP failed to meet FofS for the depth requirements required for very deep sea applications.

S42XHS—syntactic foams made with S42XHS glass bubbles failed to meet target densities by up to 0.024 g/cc. This makes them even less efficient than advertised. However, a foam specimen was made with HCP of 151 MPa at density of 0.67 g/cc. Whilst FofS in this vicinity might be acceptable, its density is less than desirable.

iM30K—a syntactic foam specimen made with iM30K glass bubbles had a broadly acceptable density. It also survived the highest packing density of all other mixes. Despite having exceptionally high HCP (206.8 MPa) it is too heavy for the application for general buoyancy. However, it may be useful in other areas of a deep sea vehicle that require light-weight and exceptional strength material.

With reference to FIG. 6 and the associated table, a grade of glass bubble between XLD6000 and iM30K appears to be preferable. Lying on a straight line between these two products, "target low" would be a glass bubble with HCP of 10,000 psi (68.9 MPa) at 0.35 g/cc density whilst "target high" would be a bubble with HCP of 16,000 psi (110.3 MPa) at 0.425 g/cc density. It was envisaged that using such microspheres, not only could the FofS be met on HCP but a lightweight buoyancy material for any depth application could be produced. Even a single grade between these targets would help fill a void to allow manufacturers of syntactic foam to meet customer needs that want high strength, more efficient foams.

Figure 7:
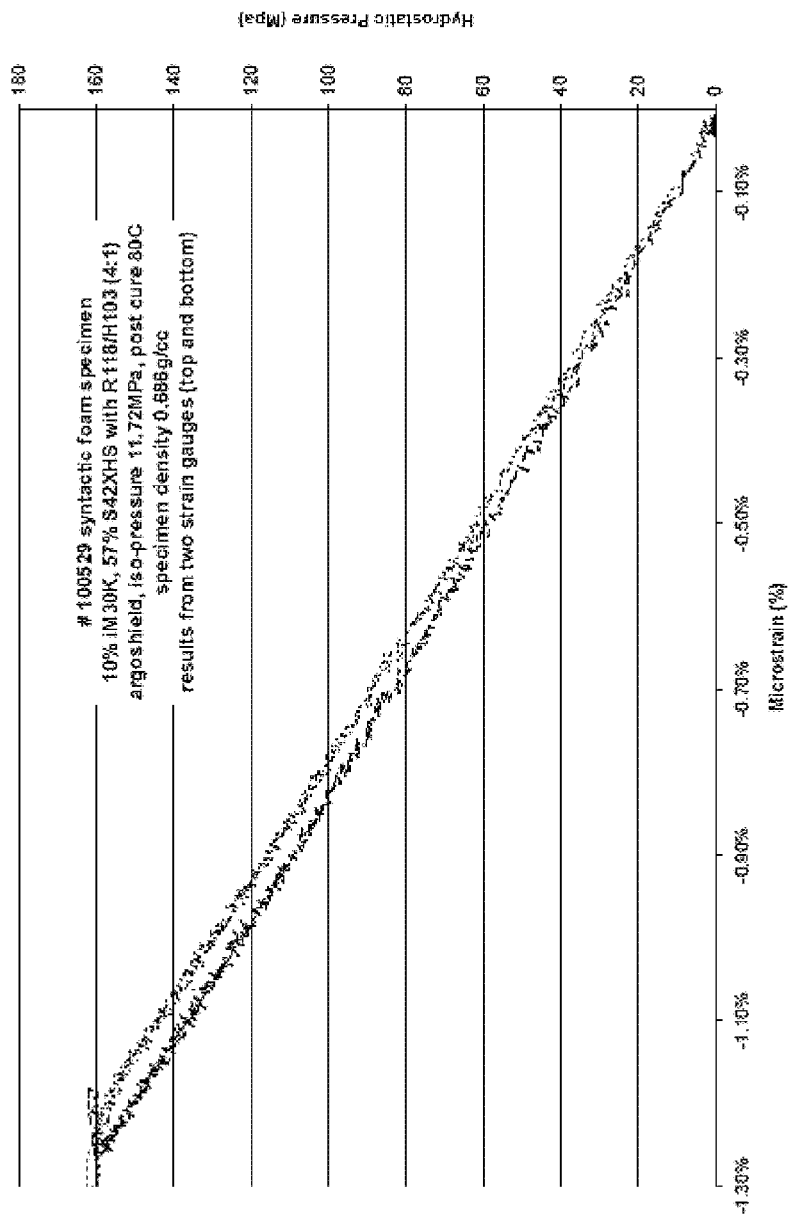
FIG. 7 shows a pressure-strain curve of a syntactic foam composite under hydrostatic pressure.

FIG. 7 shows the behaviour of a composite prepared using iM30K glass microspheres together with S42XHS glass microspheres under hydrostatic pressure. The iM30K microspheres provide improved strength whereas the S42XSH microspheres provide reduced density. Strain gauges were attached to top and bottom of the sample. It can be seen that there is very little difference between the curves, which indicates a substantially symmetrical compression performance and hence substantially homogeneous sample. The compression performance shows a linear change in strain with increasing pressure up to 160 MPa pressure, well above the design requirements for materials to be used in deep sea applications.

Figure 8A:
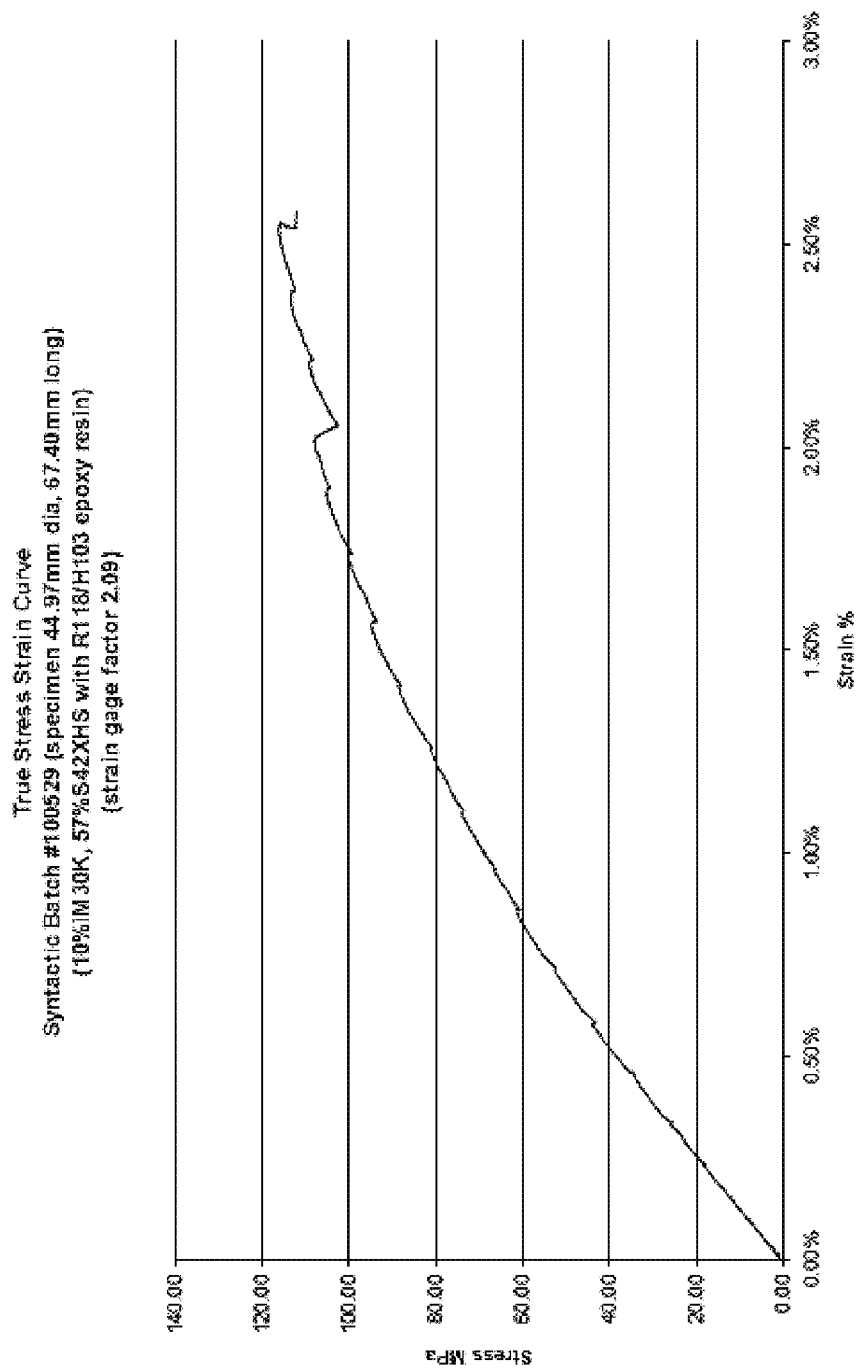
FIG. 8 shows the compressive properties of the composite used in FIG. 7: a) compressive stress strain curves; b) compressive modulus; c) Poisson ratio.
Figure 8B:
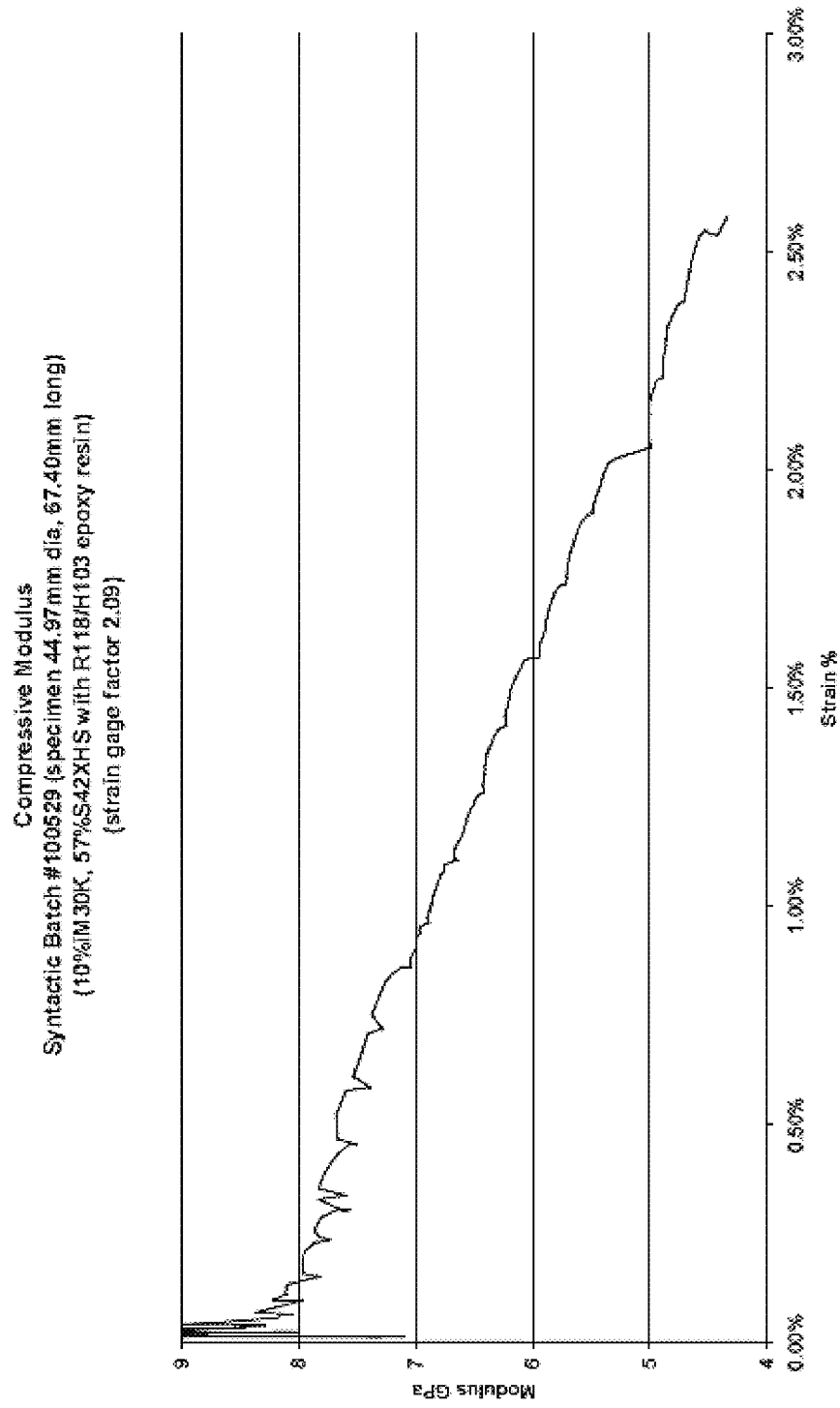
Figure 8C:
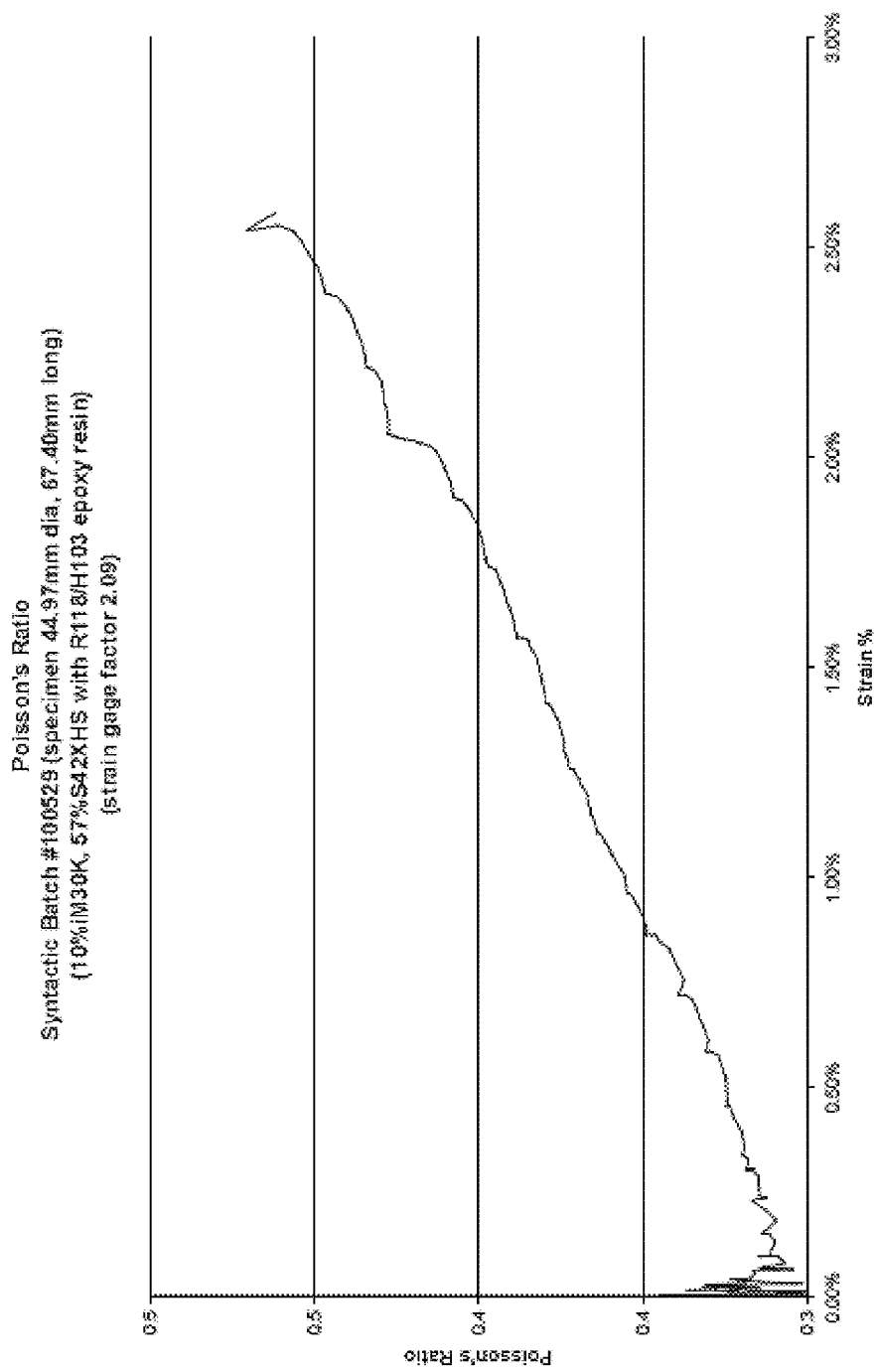

FIG. 8 shows compression tests of the sample used in FIG. 7. Thus FIG. 8a shows a stress-strain curve under compression, indicating a largely linear behaviour up to about 100 MPa/1.5% strain, with adequate performance up to about 110 MPa/2% strain. FIG. 8b shows the modulus performance. Even up to about 2%, the modulus is above 5 GPa, and up to nearly 1% it remains above 7 GPa. FIG. 8c shows the behaviour of the Poisson ratio. This increases approximately linearly, but even at about 2% strain it is only about 0.4.

Figure 9:
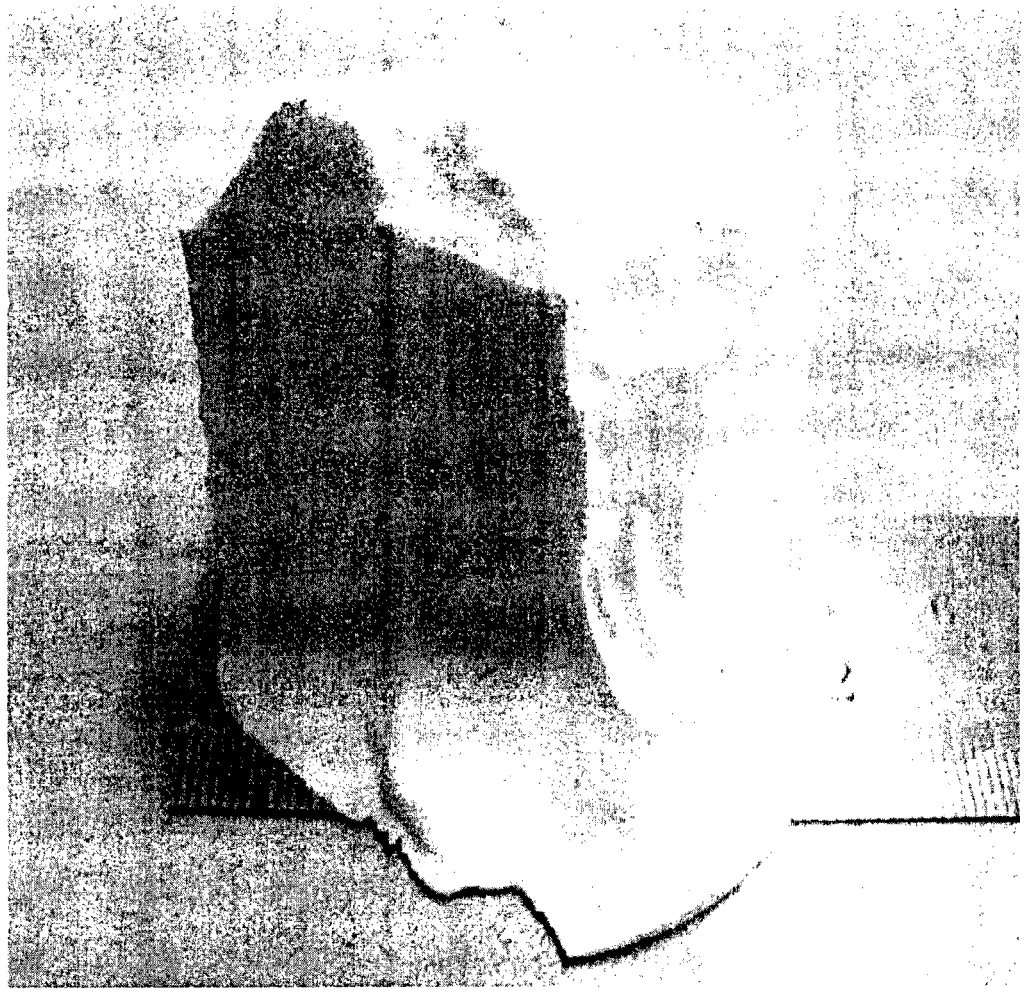
FIG. 9 shows a fragment of the actual sample of composite used in FIG. 8 following compressive failure.

FIG. 9 shows a fragment of the actual sample of composite used in FIG. 8 following compressive failure. It can be seen that the sample exhibits no visible voids. As noted earlier, voids in the cured composite can act as initiation sites for failure of the sample, leading to a reduced ultimate compressive strength.

Figure 10:
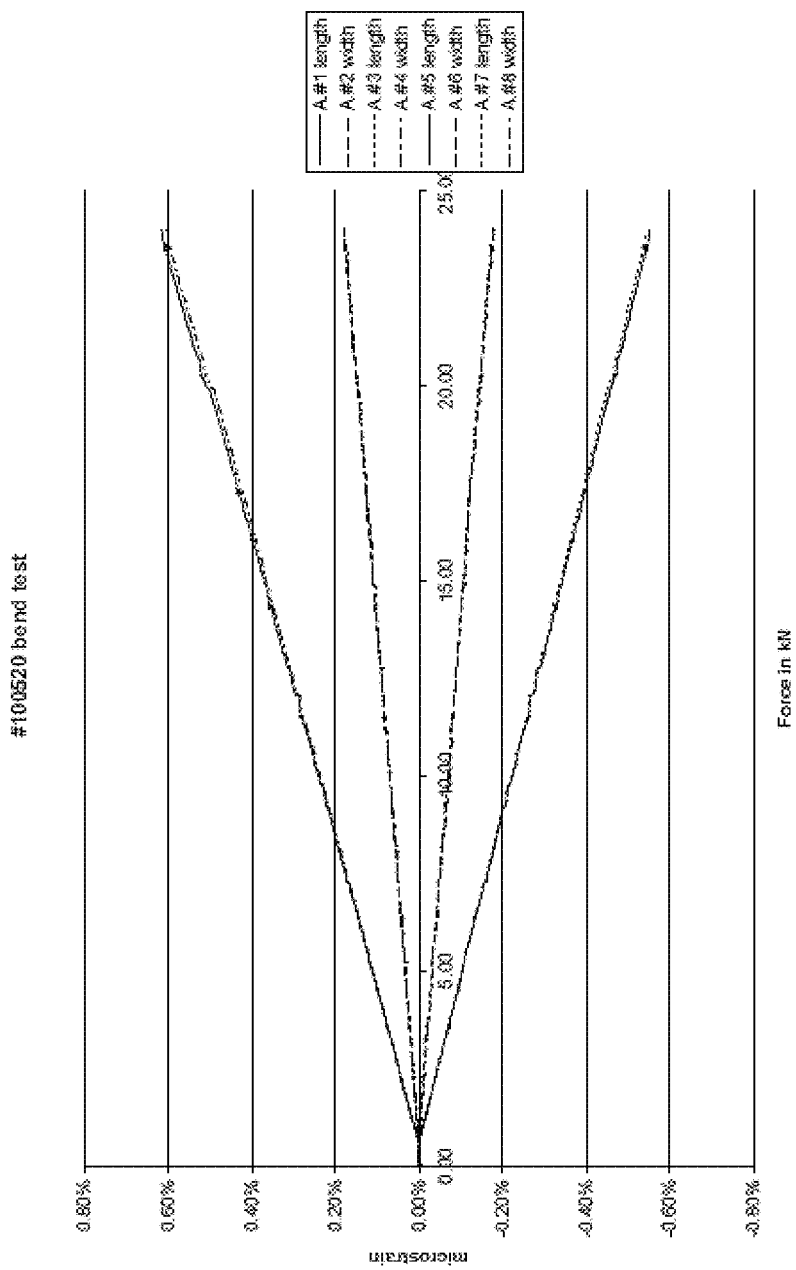
FIG. 10 shows bending test results for a composite according to the invention.
Figure 11:
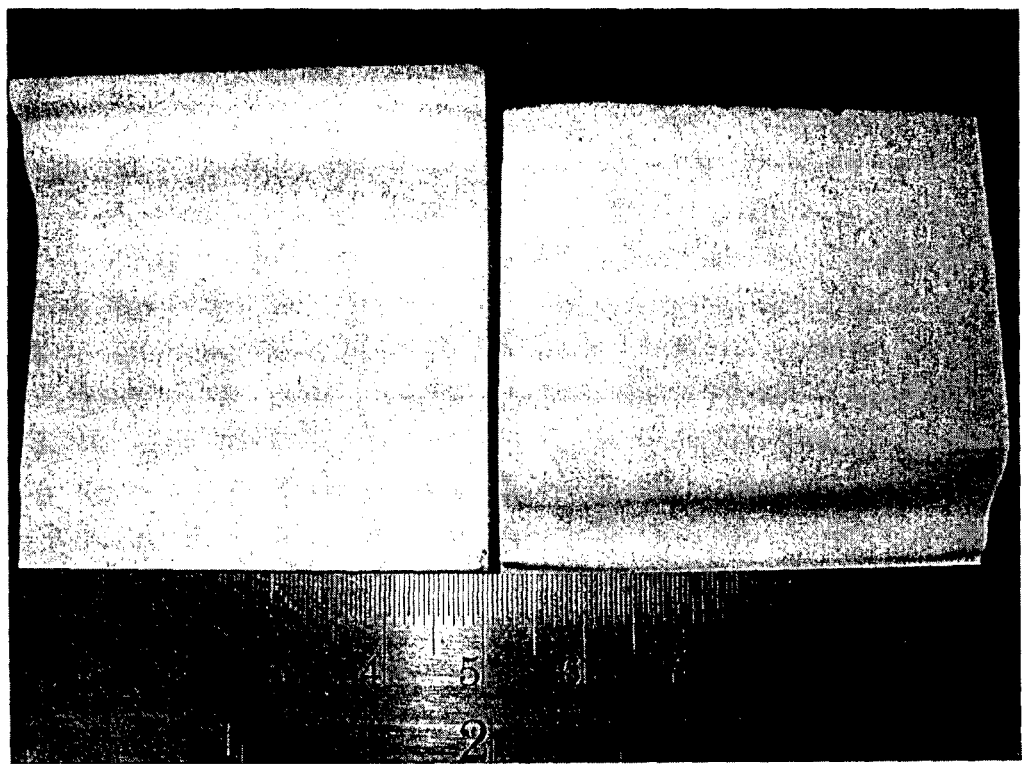
FIG. 11 shows a photograph of a fracture surface of a sample of cured composite after a bend test.

FIG. 10 shows bending test results for a sample made using 10% iM30K glass microspheres and 57% S42XHS glass microspheres with R118/H103 epoxy resin. FIG. 11 shows a sample after fracture, indicating a clean break. It can be seen that the sample can withstand a bending force of up to about 24 kN. The curves are linear, indicating that throughout the test range the material behaves elastically in bending mode. The fact that the compressive strains (the curves that slope downwardly to the right) are near similar values to those in tension (those that slope upwardly to the right) is encouraging as it indicates that the material behaves similarly in compression and tension. The sample used in this test was made using lower pressure and other specimens made using higher pressure returned higher results in bending mode.

In order to test slump of the curable mixture prior to cure, a batch of curable mixture comprising 10% iM30K glass microspheres, 57% S42XHS glass microspheres with R118/H103 epoxy mix at 20° C. was formed to a cylindrical shape approx 110 mm diameter by 380 mm long. 31.2 Kg had to be added to a flat hoard to make it pancake shaped (over a few minutes). Slump rate was minimal after that period. The width of the flattened cylinder was reduced by about 85 mm. The contact area of the flat board on the so mix was approximately 110 min wide×390 mm long oval shape. It is estimated that it had an area of approx 33,150 mm$^2$ with force of 0.306 kN, which relates to 9.227 kPa.

Test Protocols

The following test protocols were used in the experiments described above:

Pressure Testing:

A sample of 100 mm×100 mm×100 mm was used as a sample and strain gauges placed centrally on four faces or on two opposite faces. For a hysteresis test the pressure was ramped from 0 to 125 MPa and back, cycling 5 times. The ramp rate was 10 MPa/minute. Following the cycling, the sample was ramped to failure. For the failure test, the pressure at onset of failure was recorded.

Figure 12:
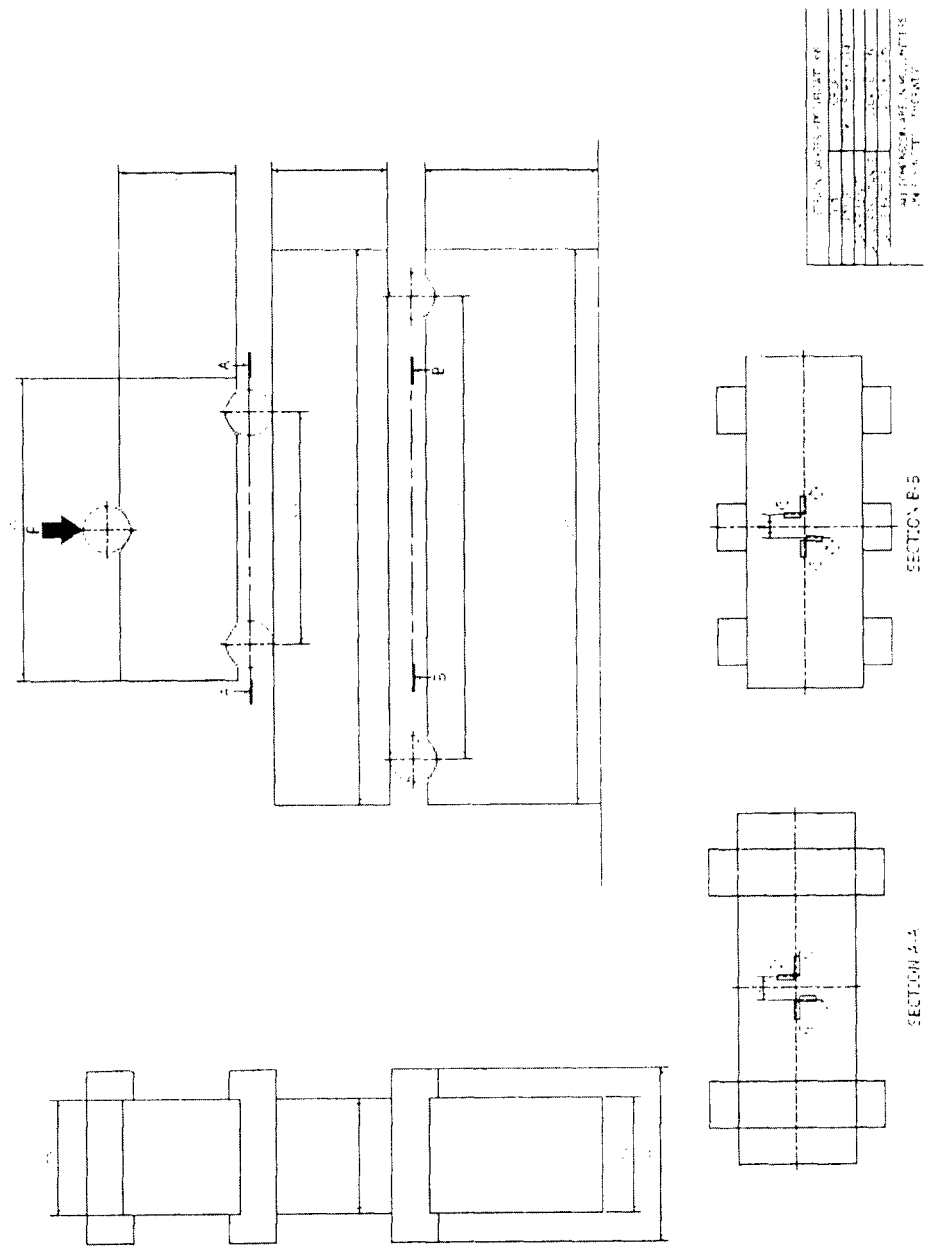
FIG. 12 is a drawing of a bend test apparatus showing location of strain gauges on the sample.

4-Point Bending Test:

The apparatus was as shown in FIG. 12. Three parallel 120° notches were made centrally in the sample as shown in FIG. 12. The rollers used were 20 mm diameter and 75 mm long. Strain gauges 0°/90° were placed centrally and 10 mm apart and duplicated at the bottom of the sample, or alternatively one 0°/90° was placed centrally top and bottom. The force was ramped until the sample failed.

A 4-point bending test was considered preferable for testing the present materials. The commonly used 3-point bending test does not necessarily lead to break at the weakest point in the specimen. A 4-point bending test was therefore adopted as this allowed the flawed specimen to break at a point of weakness.

Applications

The present invention was developed for use as a structural component in regions of very high pressure such as in the deep ocean. However other applications where the epoxy of the invention may find application included as capstan winches on yachts, in speaker cones, as blast protection and in cylinders and pistons.

The invention claimed is:

1. A process for making an epoxy composite comprising a particulate filler and having an ultimate stress under compression of greater than or equal to 100 MPa and a density of less than about 0.7 g/cc and an equilibrium water absorption at 100 MPa and 20° C. of less than about 0.5%, said process comprising:
    (a) combining an epoxy prepolymer, a curing agent and the particulate filler to form a curable mixture;
    (b) agitating the mixture under a non-air atmosphere to render it substantially homogeneous;
    (c) applying pressure to the mixture to reduce or eliminate gas pockets in the mixture; and
    (d) maintaining the pressure until the curable mixture is cured to form the epoxy composite.

2. The process of claim 1 wherein the prepolymer and the curing agent are such that the working time of the curable mixture at 20° C. is at least about 1 hour.

3. The process of claim 1 wherein the step of combining is accompanied, or preceded, by cooling of one or more of the components of the curable mixture.

4. The process of claim 1 wherein the step of combining is conducted under the non-air atmosphere.

5. The process of claim 1 wherein the solubility of the non-air atmosphere in the curable mixture is higher than the solubility of air in the curable mixture.

6. The process of claim 1 wherein the step of applying pressure is conducted such that the mixture is not exposed to air or the non-air atmosphere.

7. The process of claim 1 wherein the particulate filler has a lower density than the prepolymer.

8. The process of claim 1 wherein the particulate filler is hollow microspheres.

9. The process of claim 1 wherein the step of combining comprises combining the epoxy prepolymer, the curing agent, the particulate filler and a second filler to form the curable mixture.

10. The process of claim 1 comprising heating the curable mixture so as to initiate or accelerate cure to form the epoxy composite.

11. The process of claim 10 wherein the heating is to a temperature of less than 90° C.

12. The process of claim 10 wherein the heating is commenced at a time (referred to herein as a delay time) after commencement of application of pressure to the mixture.

13. The process of claim 12 wherein the delay time is at least about 1 hour.

14. The process of claim 10 wherein the epoxy composite is cooled prior to release of the pressure.

15. A cured epoxy composite comprising a particulate filler and having an ultimate stress under compression of greater than or equal to 100 MPa and a density of less than about 0.7 g/cc and an equilibrium water absorption at 100 MPa and 20° C. of less than about 0.5%.

16. The epoxy composite of claim 15 which exhibits linear distortion of less than or equal to about 0.9% under hydrostatic compression pressure of 110 MPa.

17. The epoxy composite of claim 15 wherein the particulate filler is hollow microspheres.

18. The epoxy composite of claim 15 additionally comprising a second filler.

19. The epoxy composite of claim 18 wherein the second filler is a fibrous filler.

20. The epoxy composite of claim 19 wherein fibres of the fibrous filler are about 0.2 to about 2 mm in mean length.

* * * * *